US012129138B2

(12) United States Patent
Wood

(10) Patent No.: US 12,129,138 B2
(45) Date of Patent: Oct. 29, 2024

(54) TENSION-INDUCING SHAFT ASSEMBLIES

(71) Applicant: Sealed Air Corporation (US), Charlotte, NC (US)

(72) Inventor: Andrew T. Wood, Charlotte, NC (US)

(73) Assignee: Sealed Air Corporation (US), Charlotte, NC (US)

( * ) Notice: Subject to any disclaimer, the term of this patent is extended or adjusted under 35 U.S.C. 154(b) by 559 days.

(21) Appl. No.: 17/432,525

(22) PCT Filed: Feb. 17, 2020

(86) PCT No.: PCT/US2020/018502
§ 371 (c)(1),
(2) Date: Aug. 20, 2021

(87) PCT Pub. No.: WO2020/172094
PCT Pub. Date: Aug. 27, 2020

(65) Prior Publication Data

US 2022/0135359 A1 May 5, 2022

Related U.S. Application Data

(60) Provisional application No. 62/809,006, filed on Feb. 22, 2019.

(51) Int. Cl.

| | |
|---|---|
| ***B65H 23/08*** | (2006.01) |
| ***B31D 5/00*** | (2017.01) |
| ***B65H 75/18*** | (2006.01) |

(52) U.S. Cl.
CPC ......... *B65H 23/085* (2013.01); *B31D 5/0073* (2013.01); *B65H 75/185* (2013.01); *B31D 2205/0023* (2013.01); *B31D 2205/0047* (2013.01); *B65H 2301/41306* (2013.01); *B65H 2301/41346* (2013.01);
(Continued)

(58) Field of Classification Search
CPC ....... B65H 75/02; B65H 75/18; B65H 75/185
See application file for complete search history.

(56) References Cited

U.S. PATENT DOCUMENTS 1,931,314 A * 10/1933 Bowman ................ B65H 75/02 206/416
2,059,267 A * 11/1936 Nichols .................. B65H 75/02 206/416
(Continued)

FOREIGN PATENT DOCUMENTS

WO 2019032447 A1 2/2019

*Primary Examiner* — William A. Rivera
(74) *Attorney, Agent, or Firm* — Jon Isaacson

(57) ABSTRACT

A tension-inducing shaft system includes a shaft, two shaft caps, and a biasing mechanism. A bore extends through the shaft between two ends of the shaft. The shaft caps are positioned on the two ends of the shaft. Each shaft cap includes a collar having a size that is larger than the bore, a keyed end, and an anchor. The biasing mechanism is arranged inside the bore and is coupled to the anchors of the shaft caps so that the biasing mechanism exerts inward forces on the shaft cap. The keyed ends of the shaft caps can be coupled to a housing so that the shaft caps do not rotate with respect to the housing. The shaft is configured to rotate with respect to the shaft caps such that, when the keyed ends are coupled to the housing, the shaft is capable of rotating with respect to the housing.

20 Claims, 27 Drawing Sheets

(52) U.S. Cl.
CPC .............. *B65H 2301/41369* (2013.01); *B65H 2301/51432* (2013.01); *B65H 2404/1415* (2013.01); *B65H 2404/147* (2013.01); *B65H 2701/1752* (2013.01); *B65H 2701/1944* (2013.01)

(56) References Cited

U.S. PATENT DOCUMENTS

| | | | | |
|---|---|---|---|---|
| 4,582,273 | A * | 4/1986 | Saraisky | B65H 75/08 242/588.1 |
| 6,800,162 | B2 | 10/2004 | Kannankeril et al. | |
| 6,982,113 | B2 | 1/2006 | Kannankeril et al. | |
| 7,018,495 | B2 | 3/2006 | Kannankeril et al. | |
| 7,223,461 | B2 | 5/2007 | Kannankeril et al. | |
| 7,507,311 | B2 | 3/2009 | O'Dowd | |
| 7,807,253 | B2 | 10/2010 | Kannankeril | |
| 9,004,392 | B1 * | 4/2015 | Bigbee, Jr. | B65H 49/324 242/608.1 |
| 9,376,280 | B2 * | 6/2016 | Page | B65H 16/06 |
| 9,701,091 | B2 * | 7/2017 | Page | B65H 23/06 |
| 11,383,476 | B2 * | 7/2022 | Wagner | B65H 75/185 |
| 2010/0084503 | A1 * | 4/2010 | Burgess | A47K 10/40 242/565 |
| 2014/0027553 | A1 | 1/2014 | Page et al. | |
| 2016/0288484 | A1 | 10/2016 | Coussens et al. | |
| 2018/0236742 | A1 * | 8/2018 | Cheich | B31D 5/0065 |
| 2018/0281336 | A1 * | 10/2018 | Cheich | B31D 5/0065 |
| 2020/0016860 | A1 * | 1/2020 | Cheich | B31D 5/0065 |
| 2020/0239259 | A1 * | 7/2020 | Page | B65H 23/06 |
| 2021/0129477 | A1 * | 5/2021 | Wagner | B65H 75/185 |

* cited by examiner

TENSION-INDUCING SHAFT ASSEMBLIES

BACKGROUND

The present disclosure is in the technical field of inflatable film. More particularly, the present disclosure is directed to tension-inducing shafts that resist rotation of a roll of film to induce tension in the film as the film is withdrawn from the roll.

Air cellular cushioning materials are commonly used to protect articles during shipment. One such product is Bubble Wrap® air cellular cushioning sold by Sealed Air Corp. Air cellular cushioning is generally prepared at a production plant and shipped in rolls to distributors and end users. Since the rolls are bulky and have a large volume to weight ratio, shipping costs are relatively high. In addition, the large volume to weight ratio means that relatively large storage areas may be required for storing inventoried cushioning.

To address these issues, inflatable films have been shipped to end users in supply rolls having a relatively low volume to weight ratio. End users are able to inflate the film as needed. It is desirable that end users have access to film inflation systems that inflate and seal such films reliably and consistently to provide desired air cellular cushioning.

SUMMARY

This summary is provided to introduce a selection of concepts in a simplified form that are further described below in the Detailed Description. This summary is not intended to identify key features of the claimed subject matter, nor is it intended to be used as an aid in determining the scope of the claimed subject matter.

In a first embodiment, a system includes a shaft, a first shaft cap, a second shaft cap, and a biasing mechanism. The shaft has a first end and a second end and the shaft includes a bore that extends through the shaft from the first end to the second end. The first shaft cap is positioned on the first end of the shaft. The first shaft cap includes a first collar having a size that is larger than the bore, a first keyed end, and a first anchor. The second shaft cap is positioned on the second end of the shaft. The second shaft cap includes a second collar having a size that is larger than the bore, a second keyed end, and a second anchor. The biasing mechanism is arranged inside the bore of the shaft and coupled to the first anchor of the first shaft cap and to the second anchor of the second shaft cap so that the biasing mechanism exerts inward forces on the first and second shaft caps. The first and second keyed ends are configured to be coupled to a housing so that the first and second shaft caps do not rotate with respect to the housing. The shaft is configured to rotate with respect to the first and second shaft caps such that, when the first and second keyed ends are coupled to the housing, the shaft is capable of rotating with respect to the housing.

In a second embodiment, at least one of the first anchor and the second anchor in the first embodiment is configured to swivel.

In a third embedment, the at least one of the first and second anchors of the second embodiment is configured to swivel during respective rotation of the first and second shaft caps so that the respective rotation of the first and second shaft caps does not cause torque on the biasing mechanism or the first and second anchors sufficient to plastically deform the biasing mechanism or the first and second anchors.

In a fourth embodiment, the system of any of the preceding embodiments claim is configured such that the first shaft cap further includes a first body configured to be slid inside of the bore of the shaft from the first end of the shaft and the second shaft cap further includes a second body configured to be slid inside of the bore of the shaft from the second end of the shaft.

In a fifth embodiment, the system of the fourth claim is configured such that the first anchor extends from an end of the first body of the first shaft cap and the second anchor extends from an end of the second body of the second shaft cap.

In a sixth embodiment, the system of any one of the fourth to the fifth embodiments further comprises a first counterbore at the first end of the shaft, a second counterbore at the first end of the shaft, a first bearing located in the first counterbore, and a second bearing located in the second counterbore. A coefficient of friction between the first bearing and the first body of the first shaft cap is lower than a coefficient of friction between the bore and the first body of the first shaft cap. A coefficient of friction between the second bearing and the second body of the first shaft cap is lower than a coefficient of friction between the bore and the second body of the second shaft cap.

In a seventh embodiment, in the system of any one of the fourth to the sixth embodiments, a material of the first collar, the first body, the first collar, the second body, and the second collar includes at least one of a self-lubricating plastic or a low-friction plastic.

In an eighth embodiment, in the system of any one of the fourth to the seventh embodiments, a material of the first collar, the first body, the first collar, the second body, and the second collar includes polyoxymethylene.

In a ninth embodiment, in the system of any of the preceding embodiments, the shaft includes a circumferential groove located proximate the first end of the shaft.

In a tenth embodiment, the system of the ninth embodiment further comprises a clip located in the circumferential groove. The clip is configured to serve as a side justification for at least one of a film roll positioned on the shaft or end caps that are positioned on the shaft.

In an eleventh embodiment, in the system of any of the preceding embodiments, the shaft includes at least one keyed surface.

In a twelfth embodiment, in the system of the eleventh embodiment, the at least one keyed surface is configured to key to a corresponding surface of at least one of a film roll positioned on the shaft or end caps that are positioned on the shaft.

In a thirteenth embodiment, in the system of any of the preceding embodiments, the first keyed end is a square or rectangular protrusion that extends from the first collar of the first shaft cap and the second keyed end is a square or rectangular protrusion that extends from the second collar of the second shaft cap.

In a fourteenth embodiment, a system includes a housing and a shaft assembly. The shaft has a first end and a second end and the shaft includes a bore that extends through the shaft from the first end to the second end. The shaft also has a first shaft cap positioned on the first end of the shaft, a second shaft cap positioned on the second end of the shaft, and a biasing mechanism. The biasing mechanism is arranged inside the bore of the shaft and coupled to the first shaft cap and to the second shaft cap so that the biasing mechanism exerts inward forces on the first and second shaft caps. The first and second shaft caps are coupled to the housing so that the first and second shaft caps do not rotate with respect to the housing. The shaft is configured to rotate with respect to the first and second shaft caps such that the shaft is capable of rotating with respect to the housing.

In a fifteenth embodiment, the system of the fourteenth embodiment further includes a supply roll of film loaded on the shaft so that rotation of the supply roll of film with respect to the housing causes rotation of the shaft with respect to the housing.

In a sixteenth embodiment, the supply roll of film in the fifteenth embodiment includes a film wound around a core, wherein withdrawal of the film from the core causes rotation of the supply roll.

In a seventeenth embodiment, the system of the sixteenth embodiment further includes a first end cap configured to be inserted into a first end of the core and a second end cap configured to be inserted into a second end of the core.

In an eighteenth embodiment, each of the first and second end caps of the seventeenth embodiment includes a hole that permits each of the respect first and second end caps to be slid onto and across the shaft.

In a nineteenth embodiment, the system of any one of the fourteenth to eighteenth embodiments is configured such that the housing includes a first slot and a second slot, the first shaft cap includes a first keyed end, the second shaft cap includes a second keyed end, and the first and second shaft caps are configured to be coupled to the housing by sliding the first and second keyed ends into the first and second slots, respectively.

In a twentieth embodiment, the system of the nineteenth embodiment is configured such that the shaft assembly is configured to be uncoupled from the housing by lifting the shaft assembly so that the first and second keyed ends of the first and second shaft caps slide out of the first and second slots, respectively.

In a twenty first embodiment, the shaft assembly of any one of the fourteenth to twentieth embodiments is capable of holding supply rolls of multiple different widths.

BRIEF DESCRIPTION OF THE DRAWING

The foregoing aspects and many of the attendant advantages of the disclosed subject matter will become more readily appreciated as the same become better understood by reference to the following detailed description, when taken in conjunction with the accompanying drawings, wherein.

DETAILED DESCRIPTION

Figure 1A:
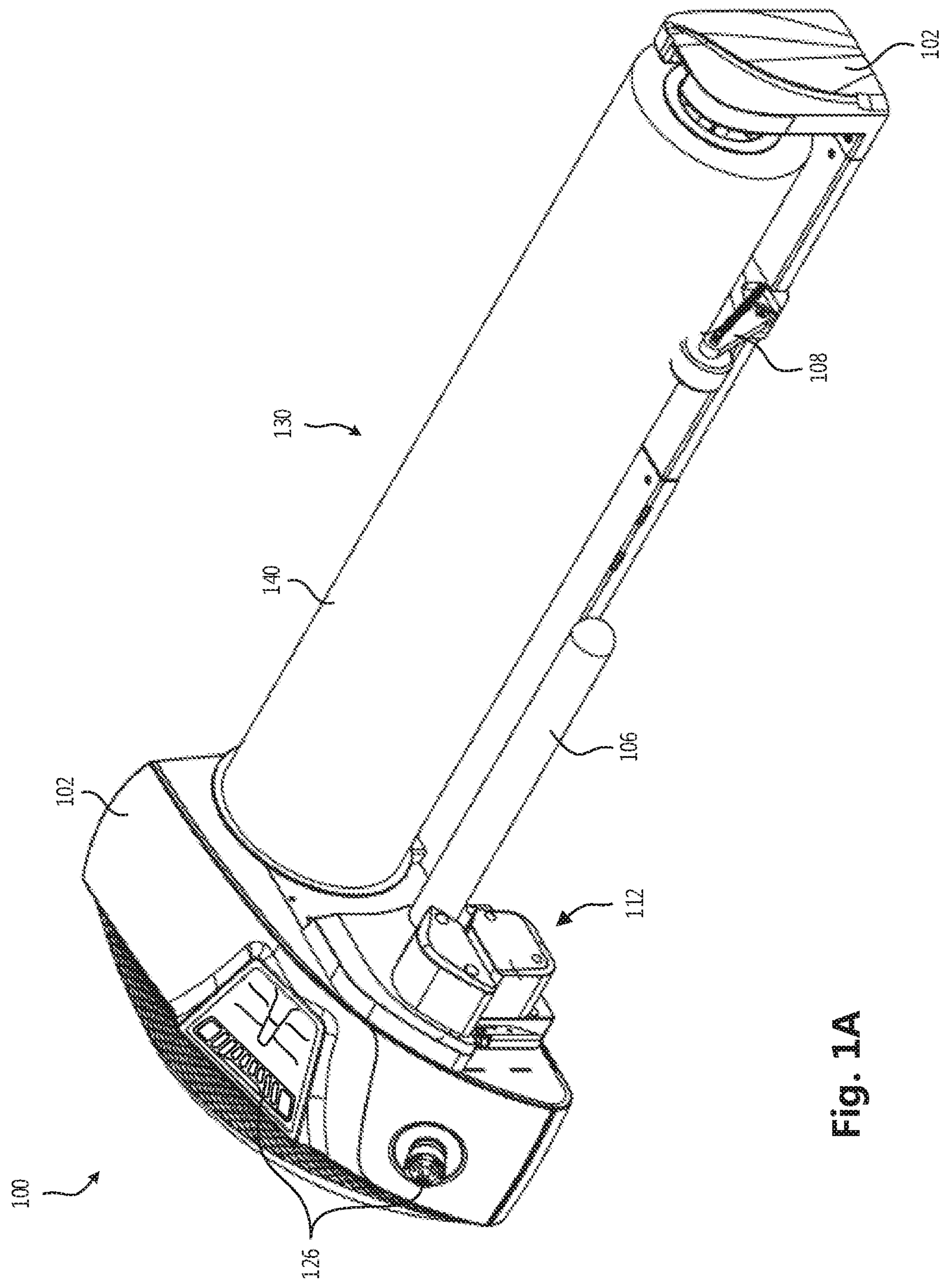
FIGS. 1A to 1D depict perspective views of an embodiment of a film inflation system, in accordance with the embodiments disclosed herein.

The present disclosure describes embodiments of film inflation systems for inflating and sealing inflatable film. In addition, the present disclosure describes various components of film inflation systems, including nozzles, sealers, idlers, and end caps for supply rolls of film.

Nozzles in film inflation systems inflate inflatable channels in films. Some nozzle designs do not inflate inflatable channels in film properly. In some cases, inconsistent rates of inflation cause air bubbles and air pillows to be unusable in packages. Described herein are embodiments of nozzles that provide for proper inflation. In one example, a nozzle includes a proximal end that separates the two sides of the common film to open the common channel as the film moves in a film path direction, a distal end that permits the two sides of the film to converge as the film moves in the film path direction, and a slot configured to direct gas transversely into the common channel to inflate the inflatable channels as the film moves in the longitudinal direction. In some examples, the proximal end is curved, the distal end is tapered, and the slot is located in the tapered distal end.

Sealers in film inflation systems form seals in film to seal inflatable channels. Some sealer designs do not form proper seals in films. In some cases, sealers form inconsistent seals in inflatable materials. Described herein are embodiments of sealers that form proper seal in inflatable films. In one example, a sealer has a body with a slot therein and a heating element exposed through a portion of the body. The film is moved be a roller assembly that includes a first roller and a second roller. One of the first and second rollers is a slotted roller and the slot in the body allows portions of the sealer to be located in the slotted roller so that the heating element is located between the first and second rollers. The heating element is capable of being activated to cause a seal to be formed in the film as the film is moved by the first and second rollers.

Some film inflation systems, especially those that pull film from the side of the film, tend to form ripples and folds in the film. In some cases, ripples and folds are formed that prevent inflatable channels from inflating properly. Described herein are embodiments of idlers that provide tension in the film to reduce the likelihood that ripples or folds form in the film. In one example, an idler includes a bracket fixedly coupled to a housing of a film inflation system that hold a supply roll of the film. An idler arm has a first end and a second end and the first end of the idler arm is rotatably coupled to the bracket. A roller is rotatably coupled to the second end of the idler arm. A biasing mechanism biases the idler in an engaged position. The roller is in contact with the supply roll of film and the biasing mechanism causes the roller to exert a force on the supply roll of film when the idler is in the engaged position. In some examples, the biasing mechanism allows the idler to be toggled between the engaged position and a withdrawn position in which the roller is not in contact with the supply roll.

Film supply rolls provide film inflation systems with film to inflate and seal. In some cases, extensive film path systems move the film and align the film with the inflation and sealing systems. However, such extensive film path systems can be expensive and require an operator to have some skill to initially feed the film through the film path. Simpler film path systems typically do not properly align the film with the inflation and sealing systems, resulting in poor inflation and/or sealing of the film. Described herein are embodiments of end caps that can be placed on supply rolls of film to properly align the film with a film inflation system. In one example, an end cap includes an insert that is placed inside of the core of the supply roll, a recessed portion coupled to the insert, and a flange that is coupled to the recessed portion and that contacts the film on the supply roll. The end cap also includes a coupling mechanism on a side of the end cap opposite the supply roll. The coupling mechanism is in a fixed position with respect to the flange and the coupling mechanism engages a coupling on the film inflation system. The recessed portion accommodates any portion of the core that extends beyond the film on the supply roll when the film is in contact with the flange.

Described below are variations of the embodiments of nozzles, sealers, idlers, and end caps mentioned above. Those components are described below both alone and in the context of film inflation systems. Also described below are additional components of film supply systems. The embodiments mentioned in the preceding paragraphs are examples only; they are not intended to identify key features of the claimed subject matter nor to limit the scope of the claimed subject matter.

Figure 1B:
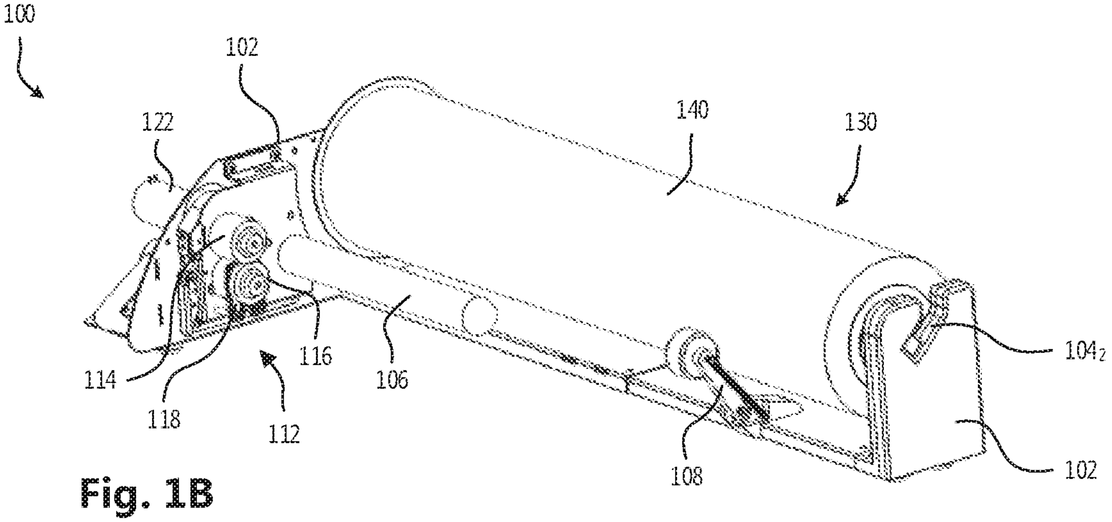
Figure 1C:
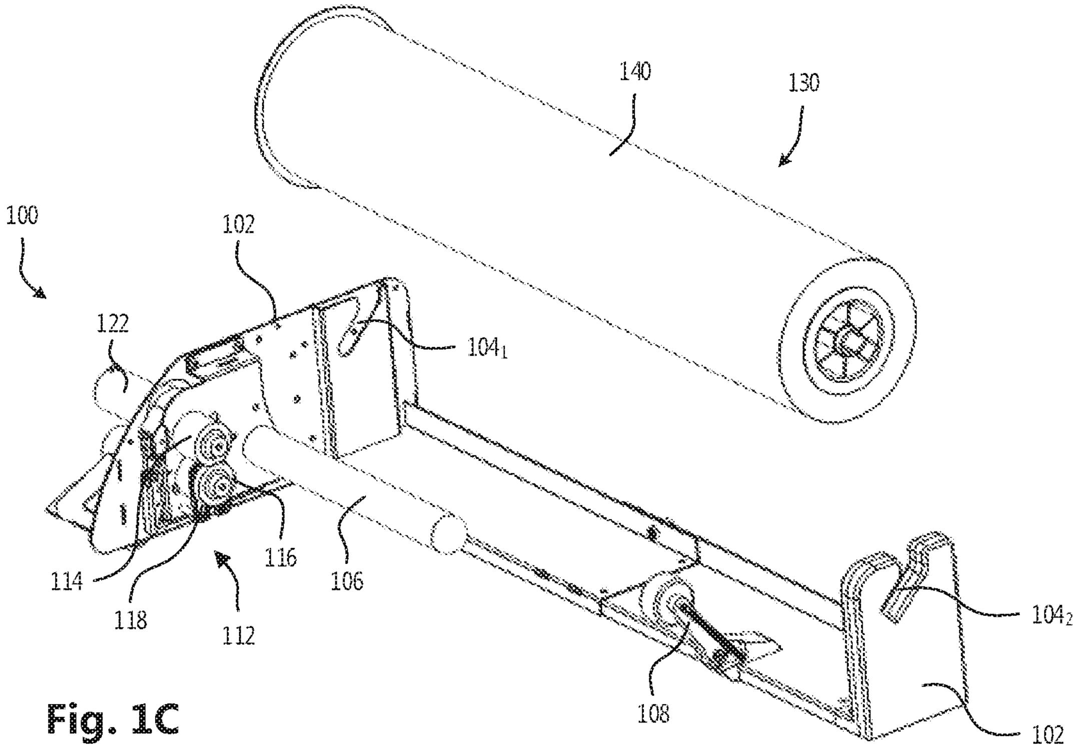
Figure 1D:
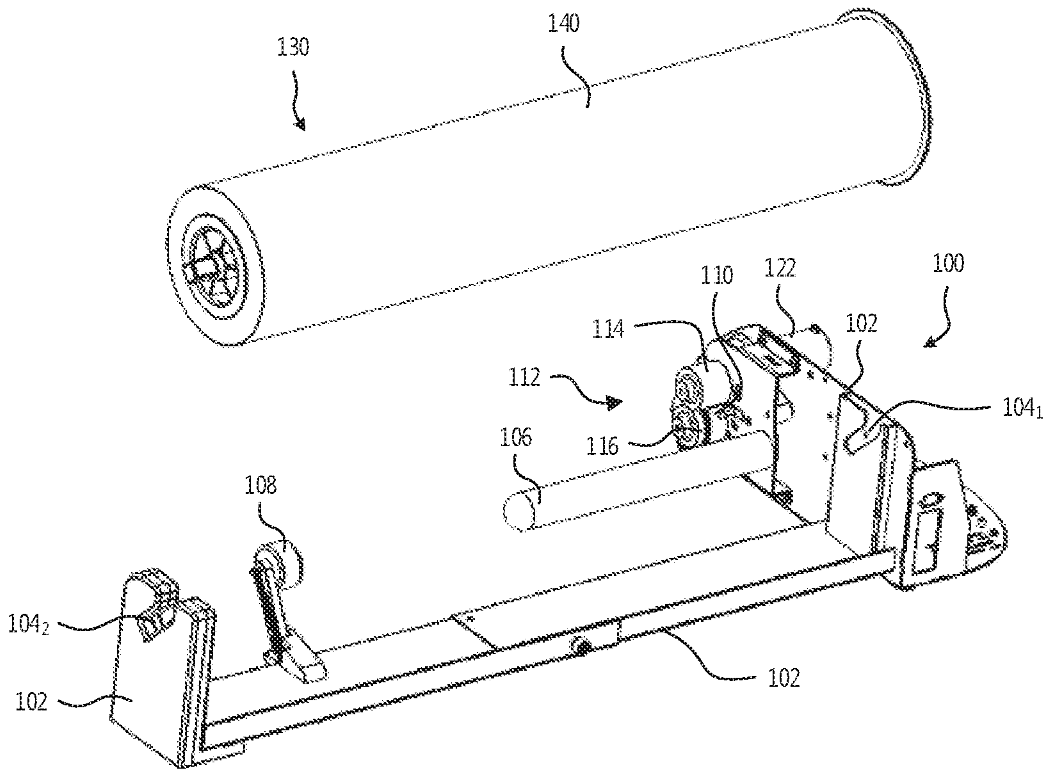
Figure 1E:
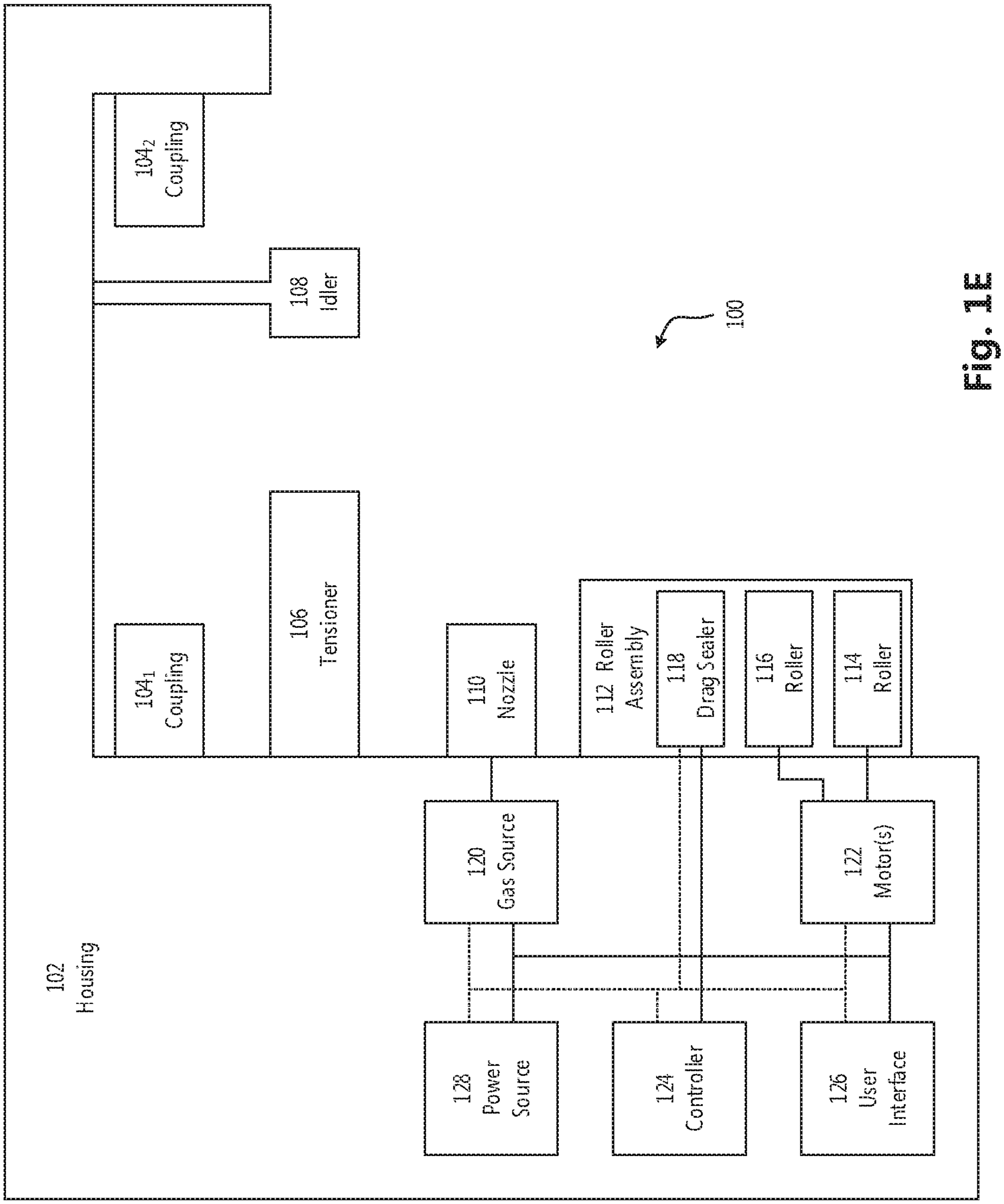
FIG. 1E depicts a conceptual block diagram showing relationships between the various components and systems of the film inflation system depicted in FIGS. 1A to 1D, in accordance with the embodiments disclosed herein.

FIGS. 1A to 1D depict perspective views of an embodiment of a film inflation system 100. FIG. 1E depicts a conceptual block diagram showing relationships between the various components and systems of the film inflation system 100. In the depicted embodiment, the film inflation system 100 includes a housing 102 configured to house and/or be coupled to components and systems of the film inflation system 100. In some embodiments, the housing 102 is made from rigid materials, such as aluminum, other metals, thermoset plastics, rigid thermoplastic materials, and the like. In some embodiments, the housing 102 is of a size and shape that permits the film inflation system 100 to be used when placed on a desk top, placed on a table top, mounted on a wall, or in any other consumer environment. In some embodiments, the housing 102 includes exterior structure configured to provide the exterior of the film inflation system 100 and/or interior structure configured to provide support for the exterior structure and for internal components of the film inflation system 100.

The film inflation system 100 includes couplings 104$_1$ and 104$_2$ (collectively couplings 104) configured to permit a supply roll 130 of film 140 to be coupled to the film inflation system 100. In some embodiments, as will be discussed in greater detail below, one or more of the couplings 104 are configured to releasably engage end caps that are placed on ends of the supply roll 130 of film 140. In other embodiments, the one or more couplings 104 are configured to releasably engage the supply roll 130 of film 140 itself. In the embodiments depicted in FIGS. 1B to 1D, the coupling 104$_1$ is configured to releasably engage a first coupling mechanism of an end cap (e.g., a groove in a spindle of the end cap) and the coupling 104$_2$ is configured to receive a second coupling mechanism of the end cap (e.g., a keyed end of the spindle). In the depicted embodiment, the coupling 104$_2$ is located on a portion of the housing 102 that is adjustable with respect to the portion of the housing 102 where the coupling 104$_1$ is located. The ability to adjust the distance between the couplings 104$_1$ and 104$_2$ allows the film inflation system 100 to accommodate different widths of supply rolls of film.

In some embodiments, the film 140 is a two-ply film that has a common channel that is in fluid communication with a number of inflatable channels. The inflatable channels are arranged to be inflated to have a three-dimensional cushion shape. While on the supply roll 130, the inflatable channels are deflated and an edge of the common channel is open. As will be discussed in greater detail below, the film inflation system 100 is configured to move the film 140 along a film path, during which the inflatable channels are inflated through the common channel and the inflatable channels are individually sealed.

In some embodiments, one or both sides of the film 140 includes at least one or more of polyethylene, ethylene/alpha-olefin copolymer, ethylene/unsaturated ester copolymer, ethylene/unsaturated acid copolymer, polypropylene, propylene/ethylene copolymer, polyethylene terephthalate, polyamide, polyvinylidene chloride, polyacrylonitrile, ethylene/vinyl alcohol (EVOH), or propylene/vinyl alcohol (PVOH). Examples of films are described in U.S. Pat. Nos. 7,807,253, 7,507,311, 7,018,495, 7,223,461, 6,982,113, and 6,800,162, the contents of all of which are hereby incorporated by reference in their entirety.

The film inflation system 100 includes a tensioner 106 coupled to the housing 102. The tensioner 106 is located in the film path downstream of the supply roll 130 of film 140. In some embodiments, the tensioner 106 is configured to direct the film 140 in the film path and to maintain a level of tension in the film as it travels along a portion of the film path. In some embodiments, the tensioner 106 includes one or more protrusions extending from a portion of the housing 102 so that the common channel of the film 140 comes into contact with the tensioner 106.

In some embodiments, the film inflation system 100 also includes an idler 108. As discussed below with respect to the embodiment shown in FIGS. 10A to 10B, the idler 108 may be biased in a toggle configuration that toggles between an engaged position where the idler 108 is biased toward the supply roll 130 of film 140 and a withdrawn position where the idler is biased away from the supply roll 130 of film 140. When the idler 108 is biased toward the supply roll 130 of film 140, as shown in FIG. 1B, the idler 108 reduces the possibility of ripples and/or folds forming in the film 140 as the film 140 moves through the film path and as the film 140 shrinks during inflation. In some embodiments, the vertical and/or horizontal positioning of the idler 108 is selected to provide an amount of tension in the film that reduces the possibility of ripples and/or folds forming during film unwinding and channel inflation.

The film inflation system 100 also includes a nozzle 110. The nozzle 110 is configured to separate two sides of the common channel in the film 140 and to insert gas through the common channel and into the inflatable channels in the film 140. In some embodiments, the nozzle 110 has a curved proximal end at the side of the nozzle 110 positioned upstream in the film path, a tapered distal end at the side of the nozzle 110 positioned downstream in the film path, and a longitudinal slot located in the tapered distal end of the nozzle 110. The curved proximal end of the nozzle 110 is configured to separate the two sides of the common channel of the film 140. The tapered distal end of the nozzle 110 is configured to permit the two sides of the film to converge before the film 140 is sealed. The longitudinal slot is configured to direct gas transversely into the inflatable channels of the film 140 as the film 140 moves along the film path.

The film inflation system 100 includes a roller assembly 112. The roller assembly 112 is configured to drive the film 140 along the film path and to seal the inflatable channels of the film 140. In the depicted embodiment, the roller assembly 112 includes a first roller 114 and a second roller 116. The first and second rollers 114 and 116 either abut each other or are positioned in an interference fit so the first and second rollers 114 and 116 are in contact with one another. A side of the film 140 is threaded between the first and second rollers 114 and 116. One or both of the first and second rollers 114 and 116 is driven to pull the film 140 off of the supply roll 130. In some embodiments, the film 140 is pulled by the first and second rollers 114 and 116 at a rate up to a speed in a range between 9 and 12 feet per minute. In some embodiments, the first and second rollers 114 and 116 are made from a resilient material, such as a rubber or resilient plastic.

Figure 2A:
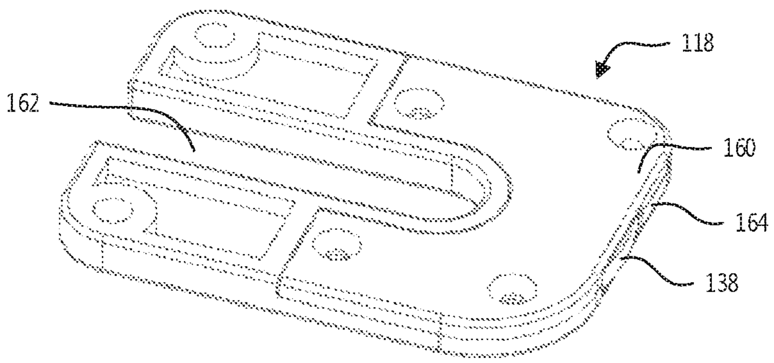
FIG. 2A depicts an embodiment of a drag sealer configured to create a seal in film after the inflatable channels in the film are inflated, in accordance with the embodiments disclosed herein.

The roller assembly 112 also includes a drag sealer 118. The drag sealer 118 is configured to create a seal in the film 140 after the inflatable channels in the film 140 are inflated. One embodiment of the drag sealer 118 is depicted in FIG. 2A. In that embodiment, the drag sealer includes a body 160 having a U-shape that includes a slot 162. In some embodiments, the body 160 is made from one or more materials with low thermal conductivity (i.e., less than or equal to about 10 $Wm^{-1}K^{-1}$ at a temperature of 20° C.), such as one or more ceramic materials. The body 160 of the drag sealer 118 has a portion 164 through which a heating element 138 is exposed. In the depicted embodiment, the portion 164 is a flat portion over which the film 140 can move. As the film 140 is moved across the portion 164, the heating element 138 causes the two sides of the film 140 to be sealed to each other. The body 160, including the slot 162, is configured to be placed is configured to be placed over a portion of roller with the heating element 138 located substantially tangential to the roller.

Figure 2B:
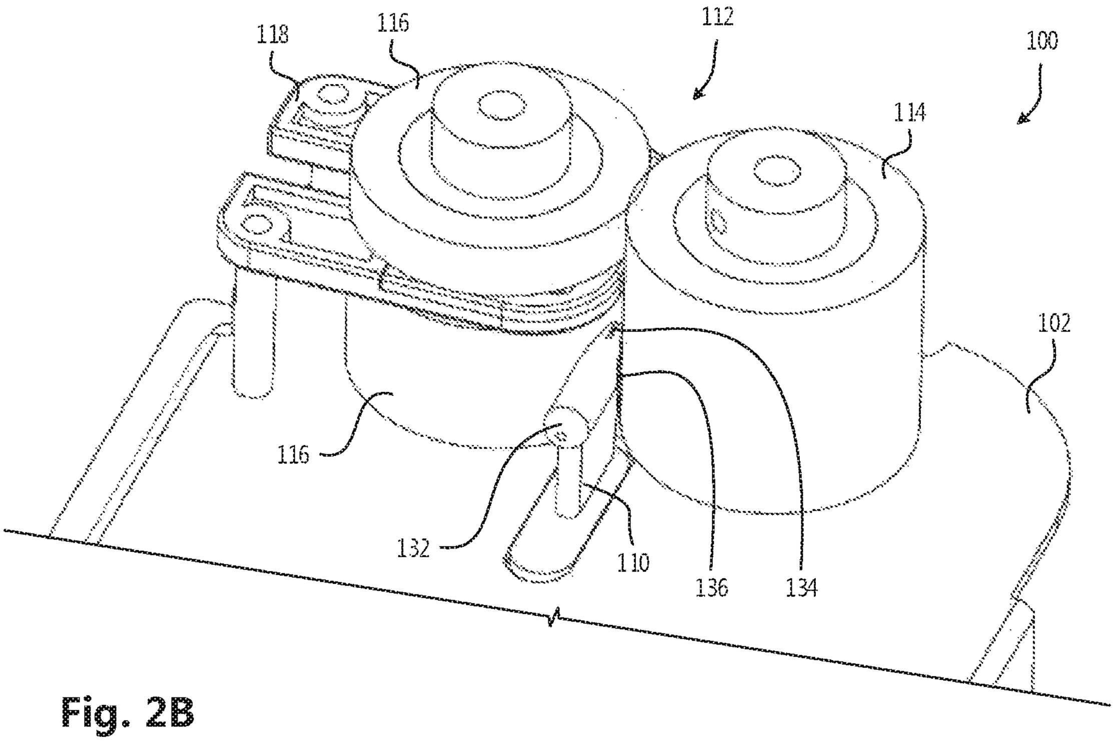
FIG. 2B depicts a partial perspective view of a nozzle and a roller assembly of the film inflation system depicted in FIGS. 1A to 1D, in accordance with the embodiments disclosed herein.

The nozzle 110 and the roller assembly 112 of the film inflation system 100 are depicted in greater detail in the partial perspective view shown in FIG. 2B. In the depicted embodiment, the nozzle 110 has a curved proximal end 132 at the side of the nozzle 110 positioned upstream in the film path, a tapered distal end 136 at the side of the nozzle 110 positioned downstream in the film path, and a longitudinal slot 134 located in the tapered distal end 136 of the nozzle 110. The curved proximal end 132 of the nozzle 110 is configured to separate the two sides of the common channel of the film 140. In the depicted embodiment, the curved proximal end 132 has a hemispherical shape with a flat portion near the center of the hemispherical shape. The tapered distal end 136 of the nozzle 110 is configured to permit the two sides of the film 140 to converge before the film 140 is sealed. The longitudinal slot 134 is configured to direct gas transversely into the inflatable channels of the film 140 as the film 140 moves along the film path.

Figure 2C:
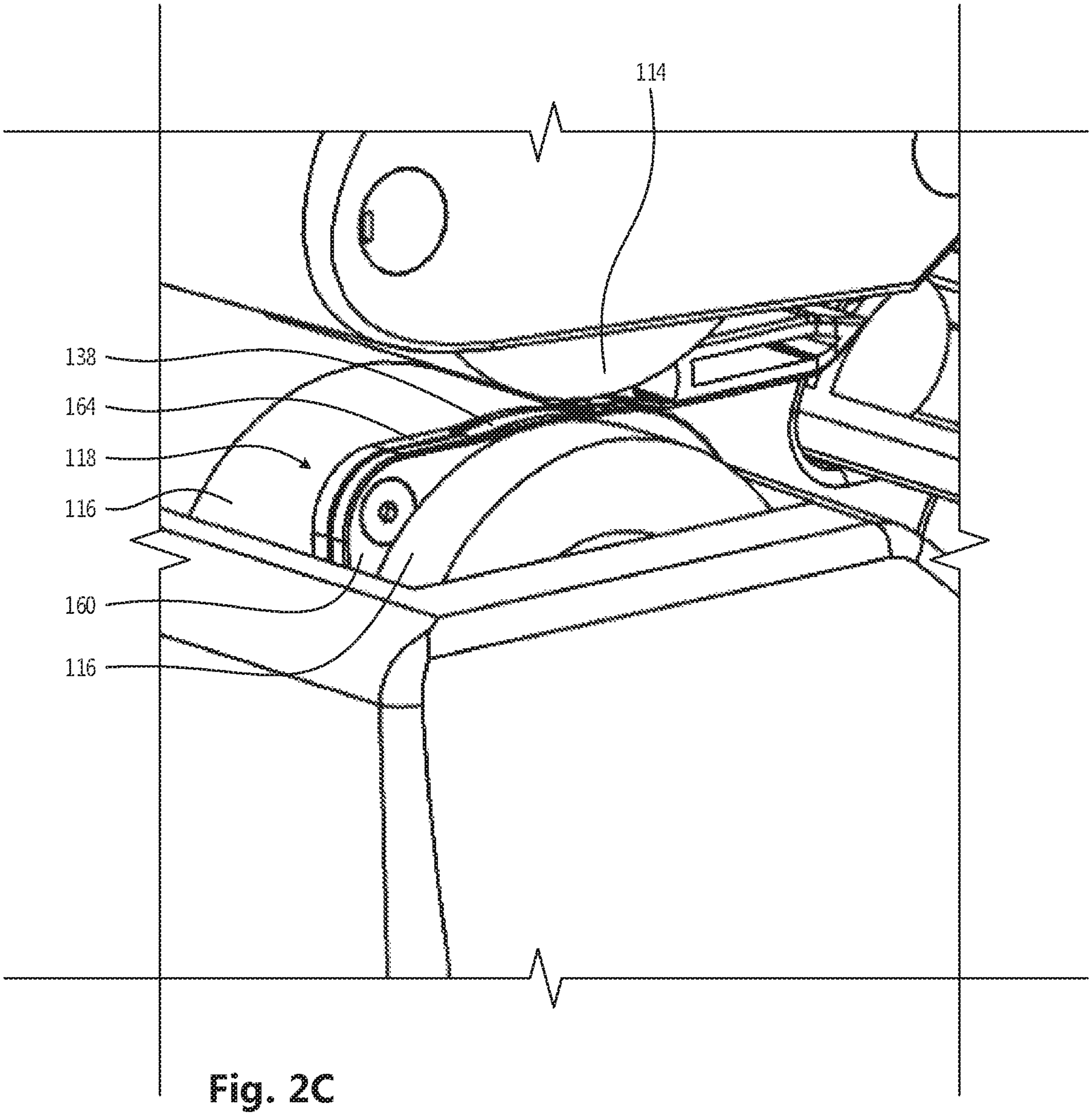
FIG. 2C a perspective view of the drag sealer located over a portion of the second roller, in accordance with the embodiments disclosed herein.

In the embodiment depicted in FIG. 2B, the drag sealer 118 is located over a portion of the second roller 116. The slot 162 in the body 160 is configured to be located around an axle of the second roller 116. The heating element 138 is exposed on the portion 164 of the body 160, which is located between the first and second rollers 114 and 116. The heating element 138 is configured to heat the film 140 as it passes through the first and second rollers 114 and 116 to seal both sides of the film 140 so the individual channels are sealed after they are inflated. The first and second rollers 114 and 116 exert pressure on the film as the heating element 138 heats the film 140. The first and second rollers 114 and 116 are configured to exert pressure on the film 140 as the film 140 is pulled through the first and second rollers 114 and 116. FIG. 2C depicts a perspective view of the drag sealer 118 located over a portion of the second roller 116. As can be seen, the portion of the heating element 138 that is exposed on the portion 164 of the body 160 is arcuate in shape. In some embodiments, such as the one shown in FIG. 2C, the shape of the heating element 138 is based on the shape of the second roller 116. For example, the outer diameter of the heating element is substantially similar to the outer diameter of the second roller 116.

Returning back to FIG. 1A to 1E, the film inflation system 100 also includes a gas source 120. In some embodiments, the gas source 120 includes a gas compressor (e.g., an air compressor) or a container of pressurized gas. In the depicted embodiment, the gas source 120 is located inside the housing 102. In other embodiments, the gas source 120 is located outside of the housing 102. The gas source 120 is in fluid communication with the nozzle 110 and the gas source 120 is configured to supply a flow of gas to the nozzle 110 to inflate the inflatable channels in the film 140.

The film inflation system 100 also includes one or more motors 122 configured to drive one or both of the first and second rollers 114 and 116. In some embodiments, the one or more motors 122 includes one motor configured to drive one of the first and second rollers 114 and 116, one motor configured to drive both of the first and second rollers 114 and 116, or two motors each configured to drive one of the first and second rollers 114 and 116. In the depicted embodiment, the one or more motors 122 are located inside the housing 102. In other embodiments, the one or more motors 122 are located outside of the housing 102. In some embodiments, the one or more motors 122 include one or more of an electrical motor, a solenoid, a combustion engine, a pneumatic motor, a hydraulic motor, or any other type of rotary driving mechanism.

The film inflation system 100 also includes a controller 124. In some embodiments, the controller 124 includes one or more of a complex programmable logic device (CPLD), a microprocessor, a multi-core processor, a co-processing entity, an application-specific instruction-set processor (ASIP), a microcontroller, an integrated circuit, an application specific integrated circuits (ASIC), a field programmable gate array (FPGA), a programmable logic array (PLA), a hardware accelerator, any other circuitry, or any combination thereof. The controller 124 is communicatively coupled to each of the drag sealer 118, the gas source 120, and the one or more motors 122. The controller 124 is configured to control operation of the drag sealer 118, such as whether the drag sealer 118 is heating the heating element and/or the temperature of the heating element of the drag sealer 118. In some embodiments, the controller 124 is configured to receive information back from the drag sealer 118, such as a temperature sensor reading indicating the temperature of the heating element of the drag sealer 118. The controller 124 is configured to control operation of the gas source 120, such as whether the gas source 120 is supplying gas to the nozzle 110 and/or the rate of flow of gas from the gas source 120 to the nozzle 110. The controller 124 is configured to control operation of the one or more motors 122, such as the whether the one or more motors 122 are driving one or both of the rollers 114 and 116 and/or the rate at which the one or more motors 122 are driving one or both of the rollers 114 and 116.

The film inflation system 100 also includes a user interface 126. In some embodiments, the user interface 126 includes a physical button, a keyboard, a mouse, a touch-screen display, a touch sensitive pad, a motion input device, a movement input device, an audio input, a pointing device input, a joystick input, a keypad input, a peripheral device, an audio output device, a video output, a display device, a motion output device, a movement output device, a printing device, a light (e.g., a light-emitting diode (LED)), any other input or output device, or any combination thereof. The user interface 126 is communicatively coupled to the controller 124. The user interface 126 is configured to receive user inputs, to communicate the user inputs to the controller 124, to receive signals from the controller 124, and to provide an output to the user. In one example, the user interface 126 receives a user input to begin moving and inflating the film, communicates a signal to the controller 124 indicating the user input, receives an indication from the controller 124 that the film inflation system 100 is operating, and illuminates an LED to indicate that the film inflation system 100 is operating. Other functions that can be controlled via the user interface 126 include the flow rate of gas from the gas source 120 to the nozzle 110, the heat produced by the drag sealer 118, the speed at which the one or more motors 122 operate, or any other function of the film inflation system 100.

The film inflation system 100 also includes a power source 128. The power source 128 is coupled to and configured to provide power to each of the drag sealer 118, the gas source 120, the one or more motors 122, the controller 124, and the user interface 126. In some embodiments, the power source 128 includes a power adapter configured to receive AC power from an external source (e.g., a power outlet, a power supply, etc.) and to convert the AC power into an appropriate level and type of electrical power for each of the drag sealer 118, the gas source 120, the one or more motors 122, the controller 124, and the user interface 126. In other embodiments, the power source 128 includes one or more batteries (e.g., rechargeable batteries, DC batteries, etc.) configured to provide an appropriate level and type of electrical power for each of the drag sealer 118, the gas source 120, the one or more motors 122, the controller 124, and the user interface 126. In some embodiments, the controller 124 is configured to control electrical output from the power source 128 to one or more of the drag sealer 118, the gas source 120, the one or more motors 122, the controller 124, and the user interface 126. For example, the controller 124 may be configured to control the one or more motors 122 by controlling an amount of electrical power provided from the power source 128 to each of the one or more motors 122.

Figure 3A:
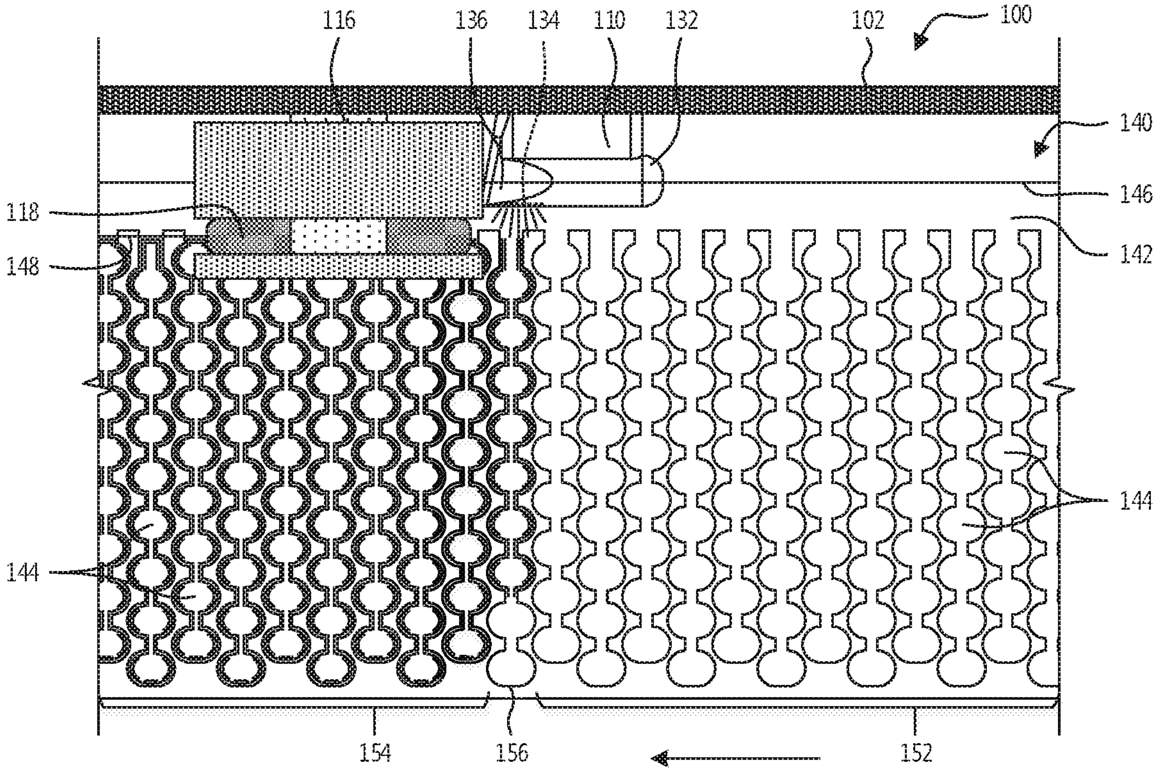
FIGS. 3A and 3B depict bottom and side views, respectively, of a film being moved by two rollers, inflated by a nozzle, and sealed by a drag sealer, in accordance with the embodiments disclosed herein.
Figure 3B:
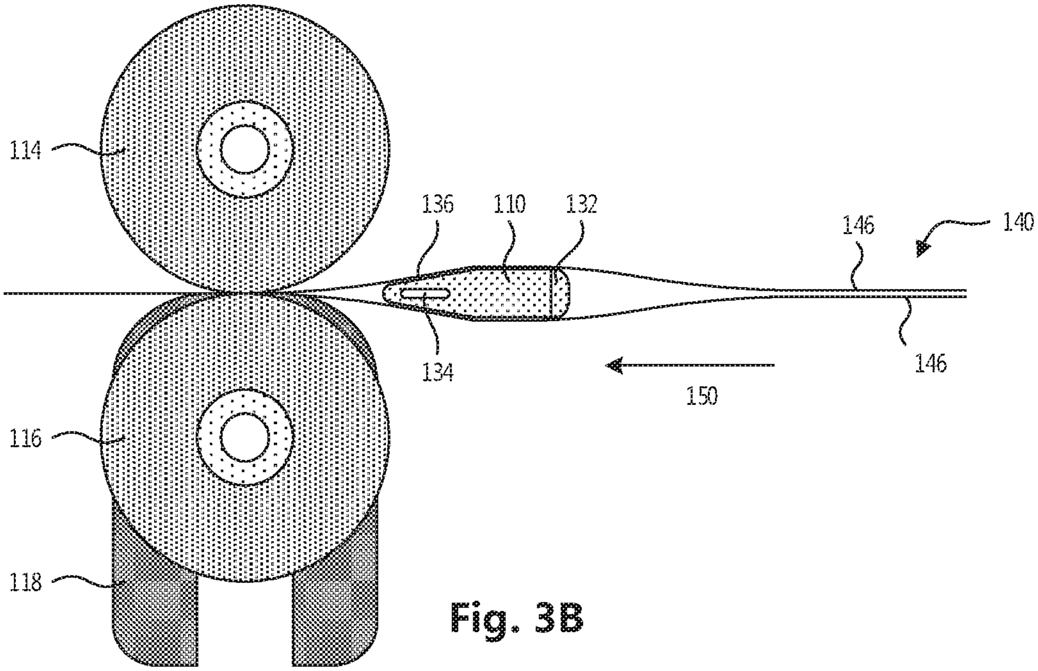

Depicted in FIG. 3A is a bottom view, respectively, of a film 140 being moved by the first and second rollers 114 and 116, inflated by the nozzle 110, and sealed by the drag sealer 118. The film 140 is formed from two layers of film that form a common channel 142 and inflatable channels 144. Depicted in FIG. 3B is a size view of the first and second rollers 114 and 116 and the sealer 118, along with a side view of the path of the edges 146 of the film 140. For ease in viewing, the only portion of the film 140 depicted in FIG. 3B is the edge 146 of the film 140. The common channel 142 is in fluid communication with each of the inflatable channels 144 so that gas directed into the common channel by the nozzle 110 inflates the inflatable channels 144. In some embodiments, the two layers of the film 140 are formed by folding a single film in half so that the ends of the film opposite the fold form an edge 146 of the common channel 142.

The first and second rollers 114 and 116 are configured to move the film 140 in a direction 150 of a film path. The common channel 142 and the edges 146 of the film pass between the first and second rollers 114 and 116 so that rotation of the first and second rollers 114 and 116 causes the film 140 to move in the direction 150. As the film 140 moves in the direction 150, the longitudinal slot 134 of the nozzle 110 directs gas through the common channel 142 into each of the inflatable channels 144. Then, as the film continues between the first and second rollers 114 and 116, the drag sealer 118 creates a seal 148 in the film 140. The seal 148 individually seals the inflatable channels to maintain the inflatable channels 144 in an inflated state. Thus, the inflatable channels 144 start as deflated inflatable channels 152 on the right side of FIG. 3A, and then become inflated inflatable channels 154 after they are inflated and/or sealed on the left side of FIG. 3A. FIG. 3A also depicts a partially-inflated inflatable channel 156 that is in the midst of being inflated by gas being inserted by the nozzle 110.

Depicted in FIG. 3B is the path of the edges 146 of the two sides of the common channel 142. On the upstream side of the direction 150 (on the right side of FIG. 3B), the edges 146 of the common channel 142 are slightly separated. As the film 140 moves in the direction 150 and it approaches the nozzle 110, the curved proximal end 132 of the nozzle 110 causes the edges 146 to separate to open the common channel 142. As the film 140 continues to move in the direction 150 along the nozzle 110, the body of the nozzle 110 between the curved proximal end 132 and the tapered distal end 136 keeps the edges 146 separate.

As the film 140 continues to move further in the direction 150 along the tapered distal end 136, the tapered distal end 136 permits the edges 146 to come closer to each other. In the depicted embodiment, the longitudinal slot 134 is located in the tapered distal end 136 of the nozzle 110. The location of the longitudinal slot 134 in the tapered distal end 136 allows the inflatable channels 144 of the film 140 to be inflated just before the edges 146 of the film 140 come together and proceed between the first and second rollers 114 and 116. This arrangement allows for gas to remain in the inflatable channels 144 until the inflatable channels 144 are held closed by the first and second rollers 114 and 116 and/or the seal 148 is created by the drag sealer.

Figure 4A:
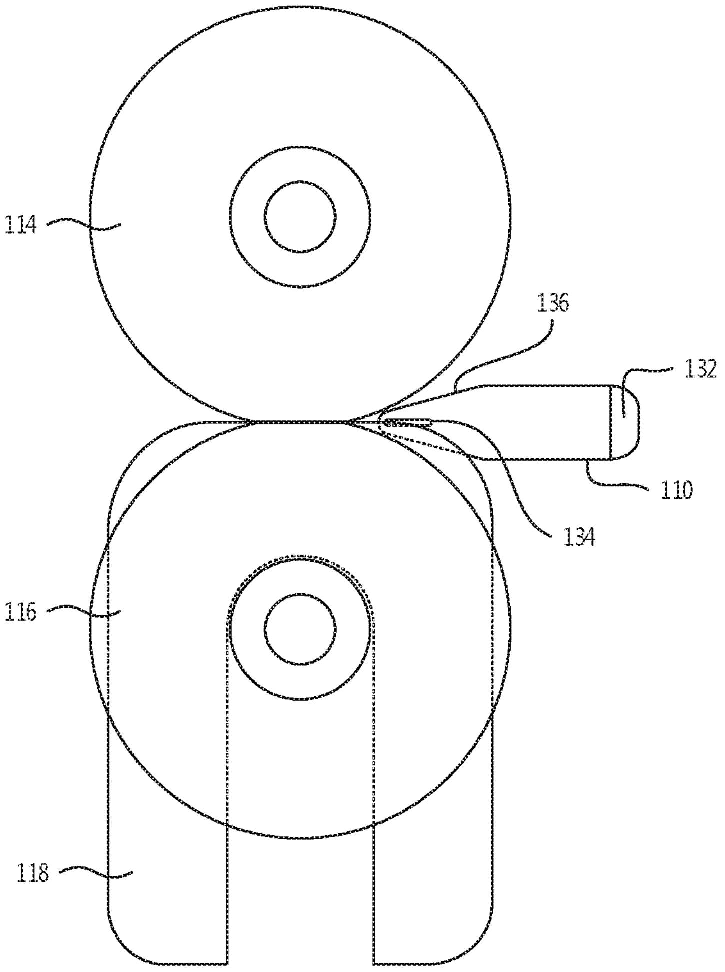
FIG. 4A depicts another embodiment of a nozzle, two rollers, and a drag sealer, in accordance with the embodiments disclosed herein.

Because the inflatable channels 144 allow gas to exit until they are held closed or sealed, it would be advantageous for the longitudinal slot 134 to be as close as possible to the first and second rollers 114 and 116 and/or the heating element 138 of the drag sealer 118. The location of the nozzle 110 in FIGS. 3A and 3B is relatively far from the first and second rollers 114 and 116 and from the drag sealer 118 for ease in viewing. In other embodiments, the nozzle 110 is closer to the first and second rollers 114 and 116 and from the drag sealer 118. Depicted in FIG. 4A is another embodiment of the nozzle 110, the first and second rollers 114 and 116, and the drag sealer 118 with the nozzle 110 at a different location with respect to the first and second rollers 114 and 116 and the drag sealer 118. As shown in FIG. 4A, the tapered distal end 136 is located near the first and second rollers 114 and 116. In the depicted embodiment, the longitudinal slot 134 is located between the first and second rollers 114 and 116 (e.g., the longitudinal slot 134 does not extend horizontally to the right as far as the first and second rollers 114 and 116 extend to the right). In the depicted embodiment, the tapered distal end 136 of the nozzle 110 is located between the first and second rollers 114 and 116 (e.g., the tapered distal end 136 does not extend horizontally to the right as far as the first and second rollers 114 and 116 extend to the right). In the embodiment shown in FIG. 4A, the first and second rollers 114 and 116 are located in interference with each other.

Figure 4B:
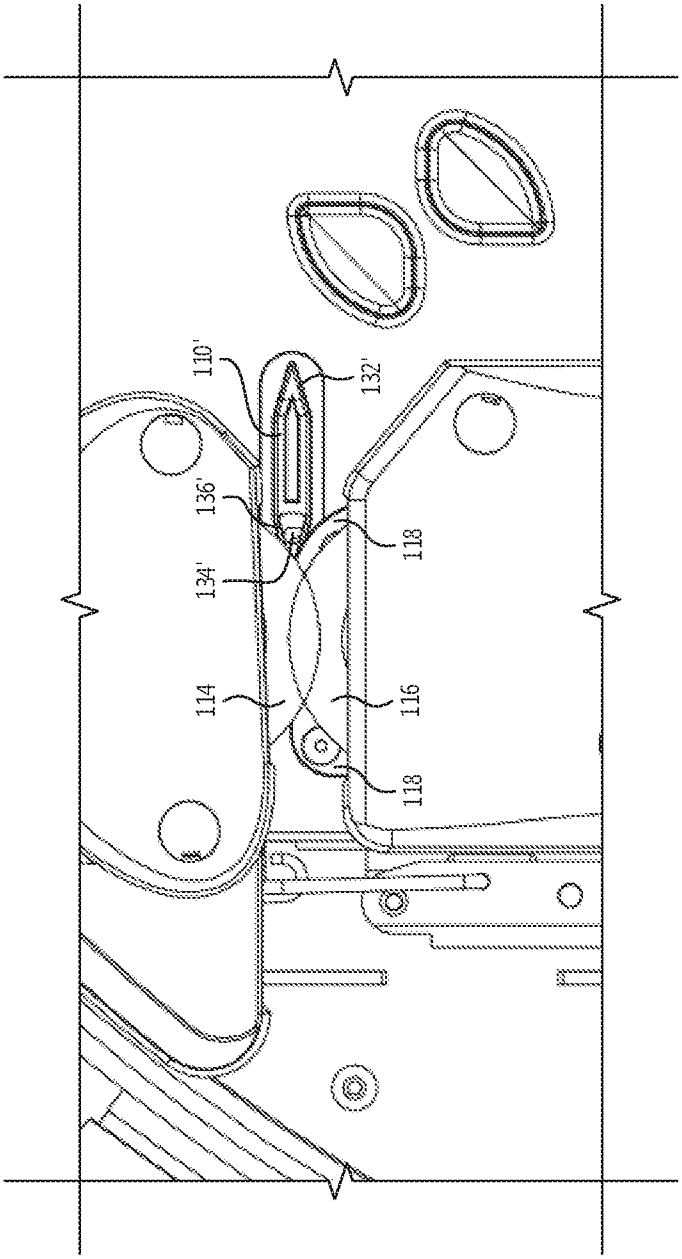
FIG. 4B depicts another embodiment of a nozzle that is usable in connection with two rollers and a drag sealer, in accordance with the embodiments disclosed herein.

Depicted in FIG. 4B is another embodiment of a nozzle 110' that is usable in connection with the first and second rollers 114 and 116 and the drag sealer 118. The nozzle 110' has a proximal end 132' at the side of the nozzle 110' positioned upstream in the film path, a tapered distal end 136' at the side of the nozzle 110' positioned downstream in the film path, and an outlet 134' located in the tapered distal end 136' of the nozzle 110'. The proximal end 132' of the nozzle 110' is configured to separate the two sides of the common channel of the film. In the depicted embodiment, the proximal end 132' has a wedged shape. The tapered distal end 136' of the nozzle 110' is configured to permit the two sides of the film to converge before the film is sealed. The outlet 134' is configured to direct gas transversely into the inflatable channels of the film as the film moves along the film path.

Figure 5:
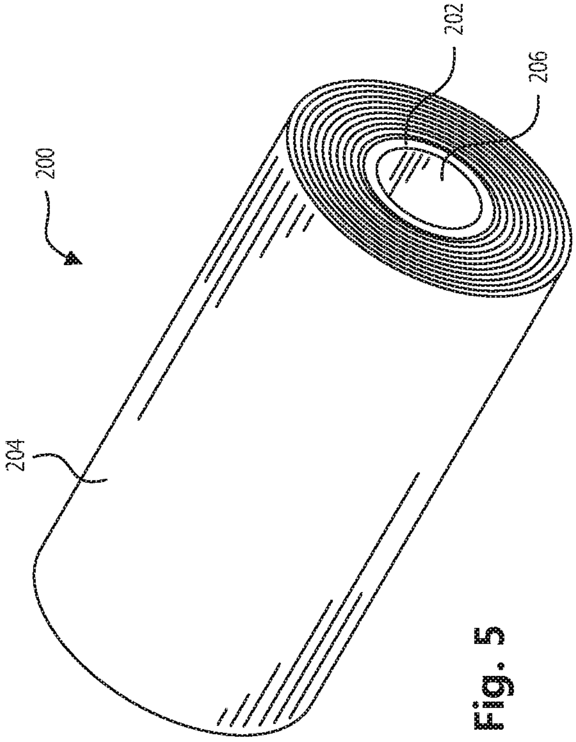
FIG. 5 depicts an embodiment of a supply roll of film, in accordance with the embodiments disclosed herein.

Depicted in FIG. 5 is an embodiment of a supply roll 200. The supply roll 200 includes a core 202. In some embodiments, the core 202 is made from a paper product (e.g., a cardboard tube, a Kraft paper tube, etc.), a plastic material, or any other material. The supply roll 200 also includes a film 204 wrapped around the core 202. In some embodiments, the film 204 includes at least one or more of polyethylene, ethylene/alpha-olefin copolymer, ethylene/unsaturated ester copolymer, ethylene/unsaturated acid copolymer, polypropylene, propylene/ethylene copolymer, polyethylene terephthalate, polyamide, polyvinylidene chloride, polyacrylonitrile, EVOH, or PVOH. In the depicted embodiment, the core 202 has a hollow bore 206. In some embodiments, a material and/or thickness of the core 202 is selected so that the core 202 does not deform from the weight of the film 204, when the core 202 is placed on a spindle, or in other uses of the core 202.

Figure 6C:
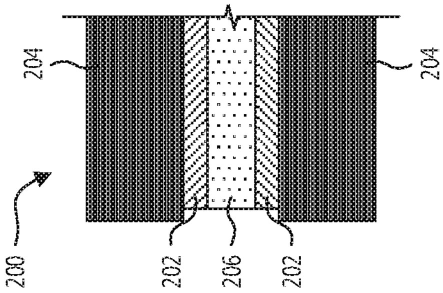
FIGS. 6A to 6C depict partial cross-sectional views of the supply roll depicted in FIG. 5, with various alignments and misalignments of film with a core of the supply roll, in accordance with the embodiments disclosed herein.
Figure 6B:
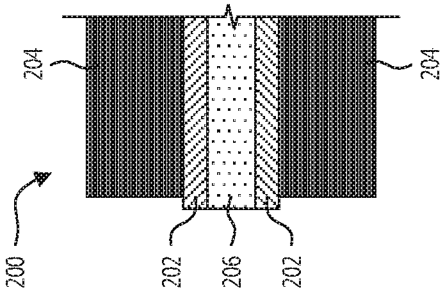
Figure 6A:
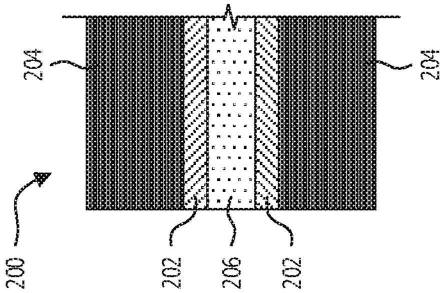

One of the difficulties with supply rolls of film is depicted in FIGS. 6A to 6C. Depicted in FIGS. 6A to 6C are partial cross-sectional views of the supply roll 200. In the embodiment shown in FIG. 6A, the end of the core 202 is aligned with the end of the film 204. In some instances, such as the instance depicted in FIG. 6B, the end of the core 202 extends out further than the end of the film 204. In other instances, such as the instance depicted in FIG. 6C, the end of the film 204 extends our further than the end of the core 202. While alignment of the core 202 and the film 204 (as depicted in FIG. 6A) may be ideal in certain circumstances, misalignment of the core 202 and the film 204 (as depicted in FIGS. 6B and 6C) may be common in most circumstances where aligning the core 202 and the film 204 is not practical.

Misalignment of the core 202 and the film 204 may not allow alignment the end of the film 204 to a surface. In some examples, the hollow bore 206 can be placed over an axle that has a flange on the side. The supply roll 200 can be slid over the axle until a portion of the supply roll 200 contacts the flange. When the core 202 and the film 204 are aligned (e.g., in FIG. 2A), the core 202 and the film 204 will contact the flange. When the core 202 extends out further than the film 204 (e.g., in FIG. 2B), the core 202 will contact the flange but the film 204 will be offset from the flange. When the film 204 extends out further than the core 202 (e.g., in FIG. 2C), the film 204 will contact the flange but the core 202 will be offset from the flange. Thus, the location of the film 204 with respect to the flange varies based on the alignment or misalignment of the film 204 with respect to the core 202.

One difficulty with not being able align the edge of the film 204 with a surface is that the film 204 may not properly feed through a film path when it is misaligned. Using the example of the film inflation system 100, a variation in the horizontal location of the side of the film 140 when the film 140 comes off of the supply roll 130 can cause the roller assembly 112 to improperly engage the film 140. This can result in rippling of the film 140, poor inflation of inflatable channels in the film 140, improper sealing of the inflatable channels in the film 140, and/or other defects.

Figure 7A:
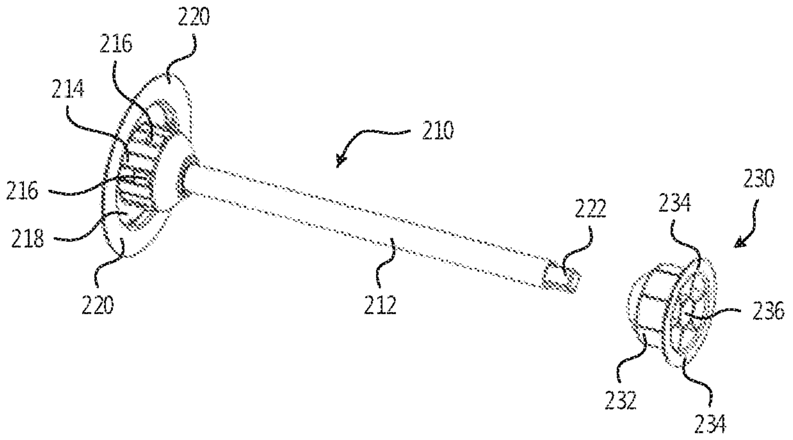
FIGS. 7A and 7B depict embodiments of end caps that are configured to be aligned with film on a supply roll regardless of the alignment of the film on a core of the supply roll, in accordance with the embodiments disclosed herein.
Figure 7B:
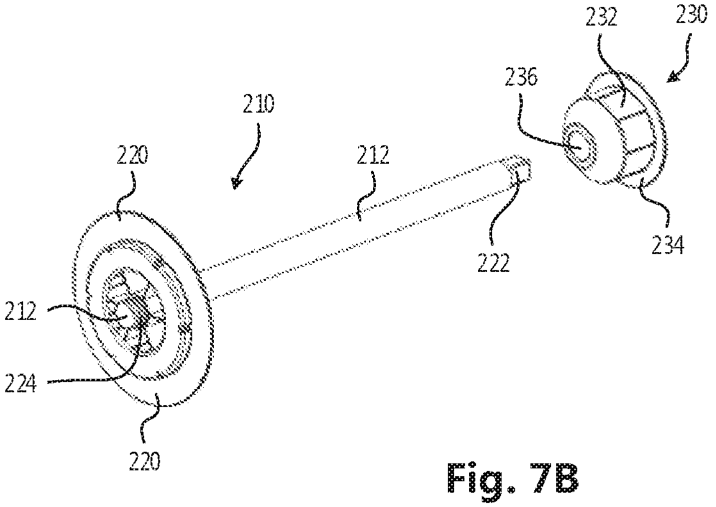

Depicted in FIGS. 7A and 7B are an embodiment of an end cap 210 that is configured to be aligned to the film 204 on the supply roll 200 regardless of the alignment of the film 204 on the core 202. The end cap 210 includes a spindle 212 configured to be inserted through the hollow bore 206 of the core 202. The end cap 210 also includes an insert 214 that has engagement elements 216. The insert 214 is configured to be inserted into the hollow bore 206 of the core 202 such that the engagement elements 216 engage the inner surface of the hollow bore 206. The end cap 210 has a recessed portion 218 extending from the insert 214 and a flange 220 extending from the recessed portion 218. In the axial direction (i.e., the direction parallel to the axis of the spindle 212), the recessed portion 218 is recessed further away from the insert 214 than the flange 220 is recessed away from the insert 214.

The spindle 212 is configured to be releasably coupled to one or more couplings of a film inflation system. The spindle 212 includes a keyed end 222 opposite the end of the spindle 212 with the flange 220. In some embodiments, the keyed end 222 is configured to engage and be releasably coupled to coupling of a film inflation system. For example, the keyed end 222 depicted in FIGS. 7A and 7B is configured to engage and be releasably coupled to the coupling $\mathbf{104}_2$ of the film inflation system 100. The spindle 212 also includes a coupling mechanism 224 near the end of the spindle 212 on the side of the flange 220 that opposite of the supply roll 200. In some embodiments, the coupling mechanism 224 is configured to engage and be releasably coupled to coupling of a film inflation system. In the embodiment depicted in FIGS. 7A and 7B, the coupling mechanism 224 is a groove configured to engage and be releasably coupled to the coupling $\mathbf{104}_1$ of the film inflation system 100.

FIGS. 7A and 7B also depict embodiments of an end cap 230 that is configured to be used on the supply roll 200 in conjunction with the end cap 210. The end cap 230 includes an insert 232 is configured to be inserted into the hollow bore 206 of the core 202 and engage the inner surface of the hollow bore 206. The end cap 230 also has a flange 234 configured to contact one or more of the core 202 or the film 204. The end cap 230 also has a bore 236 that is configured to receive the spindle 212. The end cap 230 is configured to be placed on an end of the supply roll 200 that is opposite the end of the supply roll 200 where the end cap 210 is placed.

Figure 8A:
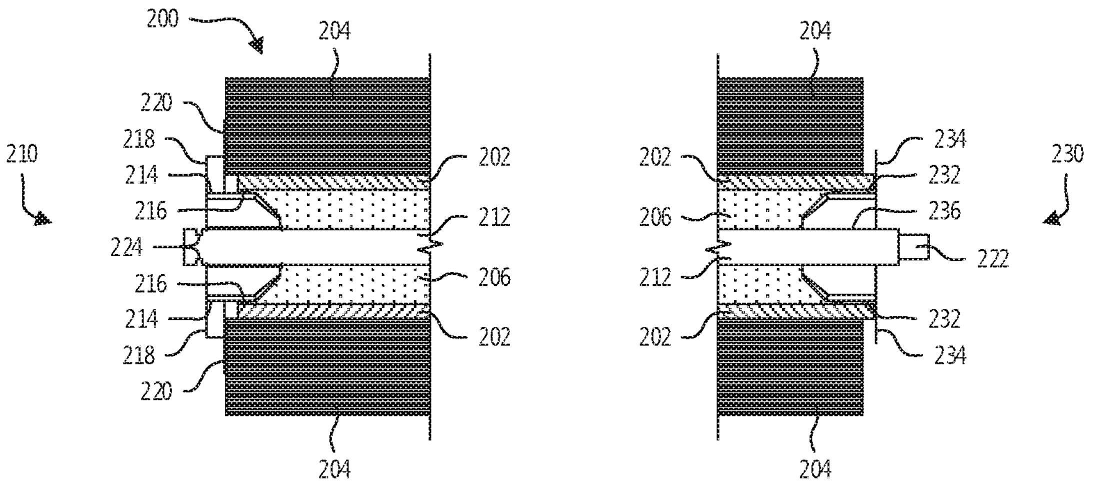
FIGS. 8A and 8B depict examples of the end caps depicted in FIGS. 7A and 7B placed on the supply roll in two instances where the core and the film are misaligned, in accordance with the embodiments disclosed herein.
Figure 8B:
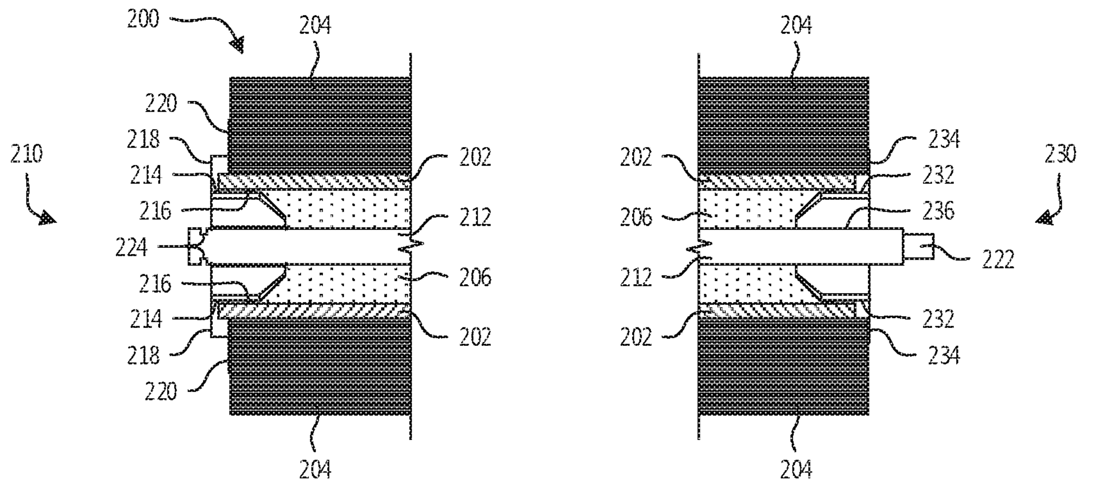

Depicted in FIGS. 8A and 8B are examples of the end caps 210 and 230 placed on the supply roll 200 in two instances where the core 202 and the film 204 are misaligned. In both FIGS. 8A and 8B, the end cap 210 is coupled to the left side of the supply roll 200 and the end cap 230 is coupled to the right side of the supply roll 200. The insert 214 and the insert 232 are located inside of the hollow bore 206. The spindle 212 of the end cap 210 passes through the bore 236 of the end cap 230. When the coupling mechanism 224 and the keyed end 222 are engaged into couplings (e.g., couplings $\mathbf{104}_1$ and $\mathbf{104}_2$), the supply roll 200 is capable of rotating around the spindle 212 to unwind the film 204 from the core 202.

In FIG. 8A, the core 202 and the film 204 are misaligned with the film 204 extending further to the left than the core 202 on the left side of the supply roll 200. In this example, the end cap 210 has been slid to the right until the flange 220 is in contact with the left side of the film 204. The end cap 230 on the right end of the supply roll 200 has been slid to the left until the flange 234 is in contact with the right side of the core 202. In this position, the spindle 212 passes through the bore 236 in the end cap 230 with the keyed end 222 extending out the right of the end cap 230.

In FIG. 8B, the core 202 and the film 204 are misaligned with the core 202 extending further to the left than the film 204 on the left side of the supply roll 200. In this example, the end cap 210 has been slid to the right until the flange 220 is in contact with the left side of the film 204. Even though the core 202 extends to the left of the left side of the film 204, the recessed portion 218 of the end cap 210 is able to accommodate the portion of the core 202 that extends beyond the left side of the film 204. The end cap 230 on the right end of the supply roll 200 has been slid to the left until the flange 234 is in contact with the right side of the film 204. In this position, the spindle 212 passes through the bore 236 in the end cap 230 with the keyed end 222 extending out the right of the end cap 230.

In both of the instances shown in FIGS. 8A and 8B, the flange 220 is in contact with the left side of the film 204. Because the flange 220 is in contact with the left side of the film 204 in both instances, the left side of the film 204 is substantially the same distance from the coupling mechanism 224 in the spindle 212. Thus, when the coupling mechanism 224 engages a coupling (e.g., coupling $\mathbf{104}_1$), the left side of the film 204 is substantially the same distance from the coupling whether the film 204 extends beyond the core 202 (e.g., in FIG. 8A) or vice versa (e.g., in FIG. 8B). While the coupling mechanism 224 is a groove that enables the spindle 212 to be coupled to a coupling, the coupling mechanism 224 may include any other type of coupling mechanism, such as a keyed portion, a slot, a clip, a pin, a bracket, and the like.

Figure 9A:
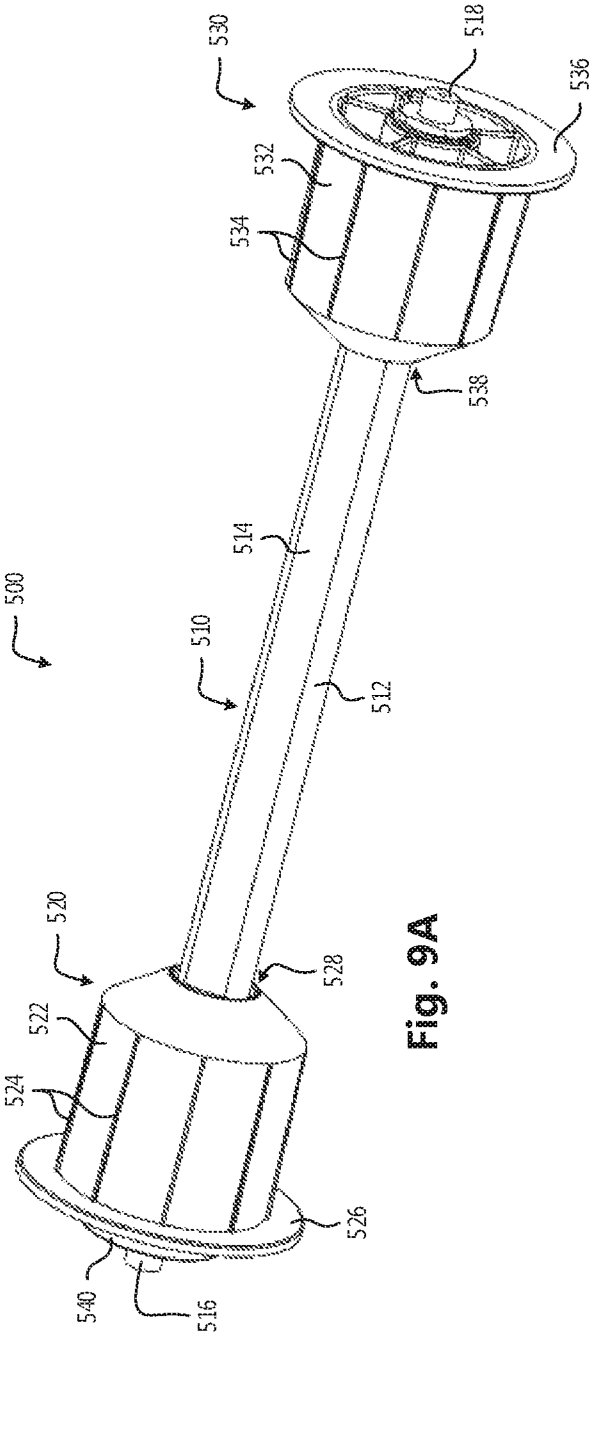
FIGS. 9A to 9C depict perspective views of another embodiment of an end cap system, in accordance with the embodiments disclosed herein.
Figure 9C:
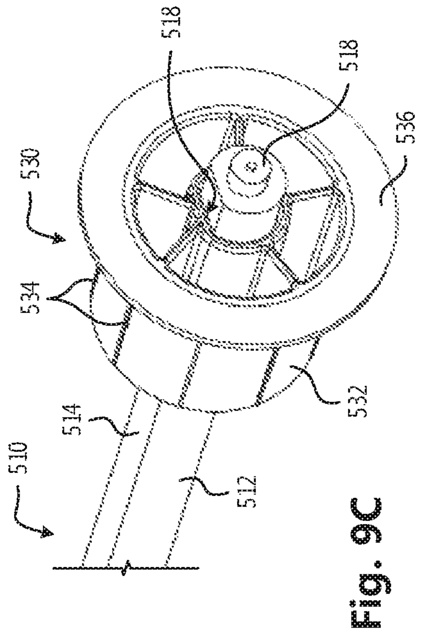
Figure 9B:
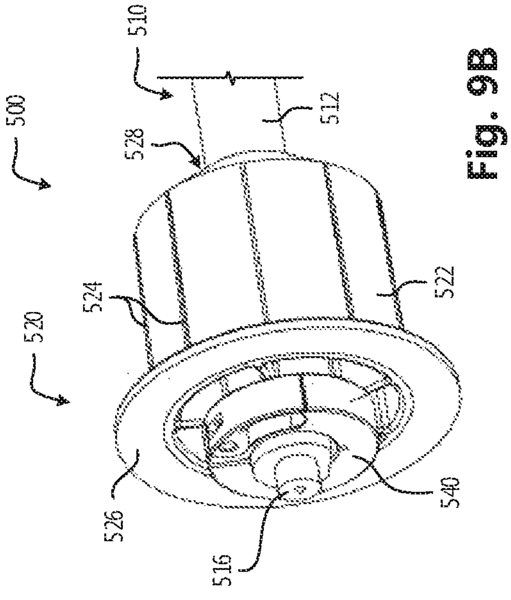

Depicted in FIGS. 9A to 9C are perspective views of another embodiment of an end cap system 500. The end cap system 500 includes a spindle 510, a first end cap 520, and a second end cap 530. In the depicted embodiment, the spindle 510 is D shaped with a cylindrical portion 512 and a planar section 514. As will be described in greater detail below, the D-shape of the spindle 510 deters relative rotation of the spindle 510 with respect to either of the first end caps 520 and 530. This arrangement allows for controlled rolling friction during the unwinding of film from a film core into which the first end caps 520 and 530 have been inserted. The spindle 510 also includes a first engagement member 516 and a second engagement member 518 on opposite ends of the spindle 510. The first and second and second engagement members 516 and 518 are configured to engage corresponding structural elements, such as cradles or bores in a housing (e.g., housing 102) to permit rotational movement of a film roll mounted on the end cap system 500 with respect to the housing.

The first end cap 520 includes a plug 522 that is configured to be inserted in one end of a film roll core. The plug 522 includes ridges 524 that are arranged to be axially aligned with the film roll core when the plug 522 is inserted into the film roll core. The ridges 524 are configured to prevent relative rotation of the film core roll with respect to the first end cap 520. The first end cap 520 also includes a flange 526. When the plug 522 is inserted into the film core roll, one or both of the film and the film roll core contacts the flange 526, depending on whether the film is aligned with the end of the film roll core (see, e.g., FIG. 6A), the film roll core extends beyond the film (see, e.g., FIG. 6B), or the film overhangs the end of the film roll core (see, e.g., FIG. 6C). The first end cap 520 also includes a bore 528 arranged for the spindle 520 to be inserted therethrough. In the depicted embodiment, the bore 528 has a D-shape corresponding to the D-shape of the spindle 520. When the spindle 510 is inserted into the bore 528 of the first end cap 520, the shape of the bore 528 deters relative motion of the spindle 510 with respect to the first end cap 520.

The second end cap 530 includes a plug 532 that is configured to be inserted in another end of the film roll core. The plug 532 includes ridges 534 that are arranged to be axially aligned with the film roll core when the plug 532 is inserted into the film roll core. The ridges 534 are configured to prevent relative rotation of the film core roll with respect to the second end cap 530. The second end cap 530 also includes a flange 536. When the plug 532 is inserted into the film core roll, one or both of the film and the film roll core contacts the flange 536, depending on whether the film is aligned with the end of the film roll core (see, e.g., FIG. 6A), the film roll core extends beyond the film (see, e.g., FIG. 6B), or the film overhangs the end of the film roll core (see, e.g., FIG. 6C). The second end cap 530 also includes a bore 538 arranged for the spindle 510 to be inserted therethrough. In the depicted embodiment, the bore 538 has a D-shape corresponding to the D-shape of the spindle 510. When the spindle 510 is inserted into the bore 538 of the second end cap 530, the shape of the bore 528 deters relative motion of the spindle 510 with respect to the second end cap 530.

The end cap system 500 also includes an adjustable clamp 540. The adjustable clamp 540 is configured to be releasably secured to the spindle 510. The adjustable clamp 540 can be released, moved axially along the spindle 510 to a different location along the spindle, and clamped again to secure the adjustable clamp 540 at a different location along the spindle 510. The adjustable clamp 540 serves as a stop to prevent the first end cap 520 from translating further along the spindle 520 in an axial direction. The ability to move selectively secure the adjustable clamp 540 to the spindle 510 allows the first end cap 520 to be stopped at different locations along the spindle 520. To the extent that the end of film varies with respect to film roll cores (see, e.g., FIGS. 6A to 6C), a user can select the location of the adjustable clamp 540 on the spindle 510 so that the edge of the film on the film roll is a predetermined distance from the housing when the end cap system 500 is placed on the housing, regardless of the location of the edge of the film with respect to the film roll core.

While aligning one side of film with the roller and sealer components of a film inflation system increases the ability of the film inflation system to properly inflate and seal film. However, feeding the film from one side of the film also has some disadvantages. In some instances, the pulling the film from one side can cause ripples and/or folds to form in the film as it comes off of a supply roll. Ripples and/or folds can cause inflatable channels in the film to be blocked entirely or partially so that they do not fully inflate. Ripples and/or folds in the film can also cause the film to be misaligned before it reaches the roller and sealer components of the film inflation system, resulting in improper seal location in the film.

Figure 10A:
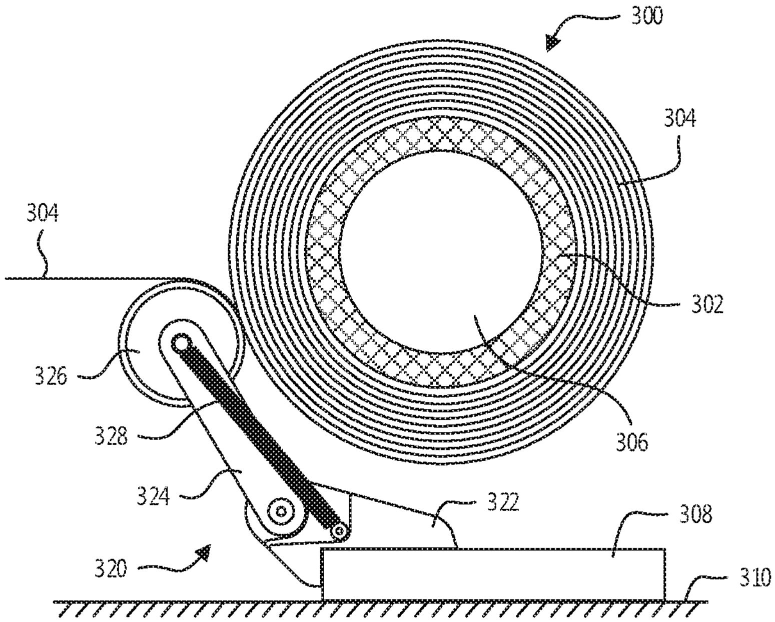
FIGS. 10A to 10B depict sides views of an embodiment of an idler configured to provide tension to film being unwound from a supply roll in two different instances, in accordance with the embodiments disclosed herein.
Figure 10B:
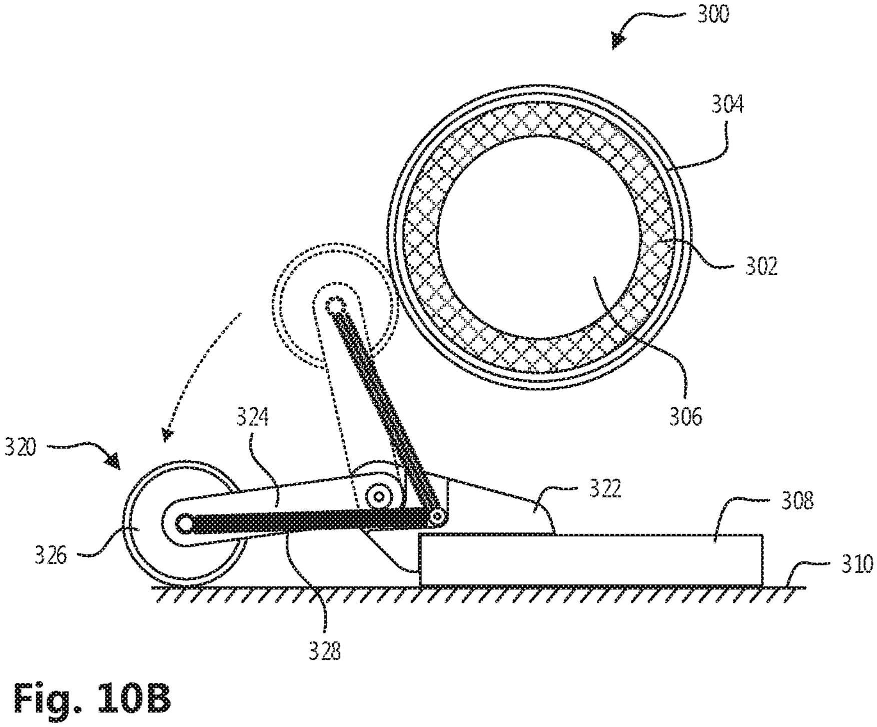

Depicted in FIGS. 10A and 10B are sides views of an embodiment of an idler 320 configured to provide tension to film 304 being unwound from a supply roll 300 in two different instances. The supply roll 300 includes a core 302 around which the film 304 is wound. The core 302 includes a hollow bore 306. Although not shown in FIGS. 10A and 10B, the supply roll 300 is removably coupled to a housing 308 of a film inflation system. In some examples, end caps are placed on the sides of the supply roll 300 and the end caps are configured to engage couplings that are fixedly coupled to the housing 308. The housing 308 is configured to be placed on and/or fixed to a surface 310. In some embodiments, the surface 310 is one of a floor, a desk top, a counter top, a wall, or any other type of surface.

The idler 320 includes a bracket 322 that is configured to be fixedly coupled to the housing 308. In some embodiments, the bracket 322 is fixedly coupled to the housing 308 by way of one or more fasteners, such as bolts, nuts, screws, rivets, anchors, and the like. In some embodiments, the bracket 322 is fixedly coupled to the housing 308 by way of something other than a fastener, such as adhesive, welds, and the like. A first end of an idler arm 324 is rotatably coupled to the bracket 322 and a second end of the idler arm 324 is rotatably coupled to a roller 326. The idler arm 324 is configured to be rotated with respect to the bracket 322 about the first end of the idler arm 324. The roller 326 is configured to rotate with respect to the idler arm 324 about the second end of the idler arm 324.

The idler 320 includes a biasing mechanism 328 configured to bias the idler arm 324 toward the supply roll 300. The biasing mechanism 328 causes the roller 326 to be in contact with and apply a force to the film 304 on the supply roll 300. In the embodiment depicted in FIGS. 10A and 10B, the biasing mechanism 328 is a tension spring that is coupled to the bracket 322 and to the second end of the idler arm 324. In other embodiments, the biasing mechanism 328 can be a compression spring, a torsional spring, a flat spring, or any other type of biasing mechanism. In some embodiments, the biasing mechanism 328 is configured to permit the idler arm 324 to toggle between an engaged position and a withdrawn position, which are described in greater detail below.

In the depiction shown in FIG. 10A, the idler 320 is in an engaged position. In this position, the force of the biasing mechanism 328 causes the roller 326 to be in contact with the film 304 on the supply roll 300. As can be seen in FIG. 10A, the film can be routed over the top of the roller 326 and then to the left of the idler 320. The film can then be pulled by, for example, a roller assembly (e.g., the roller assembly 112 of the film inflation system 100). As the roller assembly pulls the film 304, the biasing mechanism 328 resists any rotation of the idler arm 324 away from the supply roll 300. This resistance by the biasing mechanism 328 results in tension in the film 304 downstream from the idler 320. This tension in the film 304 downstream of the idler 320, along with the position of the idler 320, reduces the possibility of ripples and folds forming in the film 304.

In the depiction shown in FIG. 9B, the idler 320 transitions from the engaged position (depicted in dashed lines) to a withdrawn position (depicted in solid lines). As the film 304 unwinds from the supply roll 300, the outer diameter of the film 304 decreases. As the outer diameter of the film 304 decreases, the biasing mechanism 328 causes the idler arm 324 to rotate so that the roller 326 continues to remain in contact with the film 304. As shown in the dotted lines in FIG. 9B, the idler 320 in the engaged position remains in contact with the film 304 even though the outer diameter of the film is less in FIG. 9B than it is in FIG. 10A.

When the amount of film 304 on the supply roll 300 is low or exhausted, the supply roll 300 may be replaced with another supply roll. It may be advantageous to move the idler 320 to a withdrawn position so that the idler 320 does not interfere with the removal of the supply roll 300 from the housing 308 or the placement of another supply roll on the housing 308. To transition the supply roll 300 from the engaged position to the withdrawn position, a user may rotate the idler 320 in the direction shown by the dashed arrow. In the particular embodiment, the roller 326 is in contact with the surface 310 when the idler 320 is in the withdrawn position. In addition, in the depicted embodiment, the biasing mechanism 328 biases the roller 326 toward the surface 310. In this way, the idler 320 is toggled to be in either the engaged position or the withdrawn position to provide ease of use for a user.

Depicted in FIGS. 10A and 10B is an example of how the idler 108 maintains tension in the film 140 in the film inflation system 100. In FIG. 10A, the film 140 is fed from the supply roll 130 over the idler 108 and the tensioner 106. From this point, the film 140 is fed into the first and second rollers 114 and 116. Once the film is fed into the first and second rollers 114 and 116, the first and second rollers 114 and 116 can be driven to further advance the film 140 to the position shown in FIG. 10B. As the film 140 is advanced by the first and second rollers 114 and 116, the idler 108 reduces the possibility of folds or ripples forming in the film 140.

The amount of tension in the film 140 can be affected by a number of characteristics of the idler 108. In some embodiments, one or more characteristics of the idler 108 are select based on a particular amount of tension in the film 140 during operation of the film inflation system 100. In some embodiments, the one or more characteristics of the idler 108 include one or more of a transverse location of the idler 108 between the coupling $104_1$ and the coupling $104_2$, a length of the idler arm of the idler 108, a height of a roller of the idler 108, a dimension of a roller of the idler 108 (e.g., radius, width, etc.), a strength of a biasing mechanism of the idler 108, or any other characteristic of the idler 108.

Figure 10C:
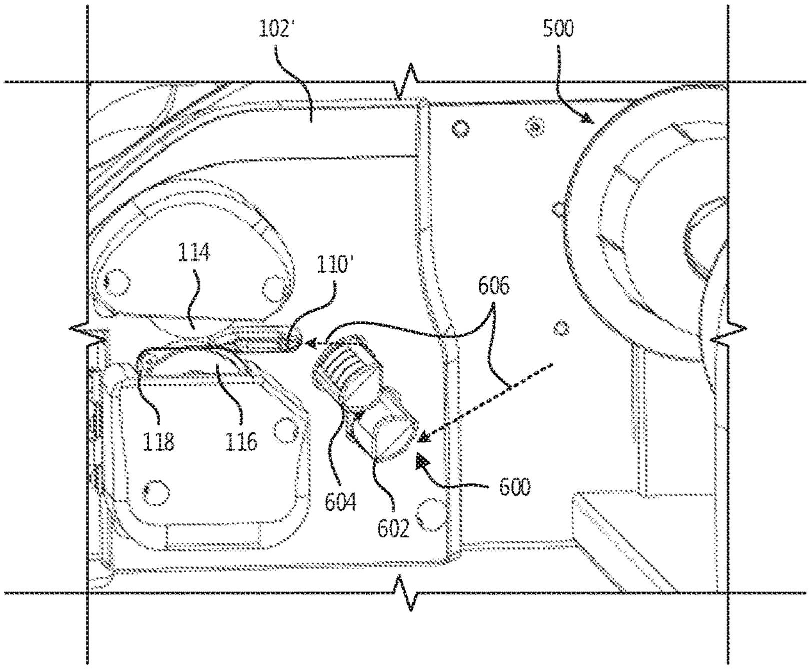
FIGS. 10C and 10D another embodiment of a tensioning system configured to provide tension to film being unwound from a supply roll, in accordance with the embodiments disclosed herein.
Figure 10D:
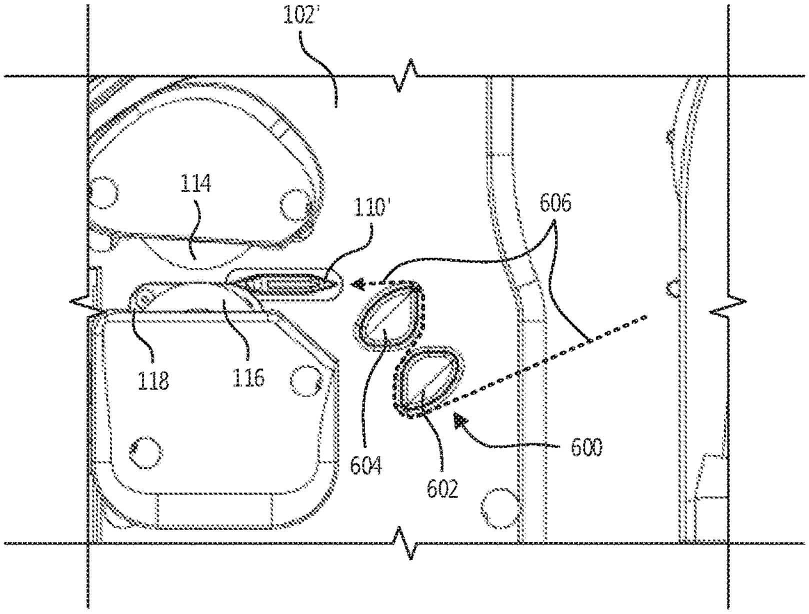
Figure 11A:
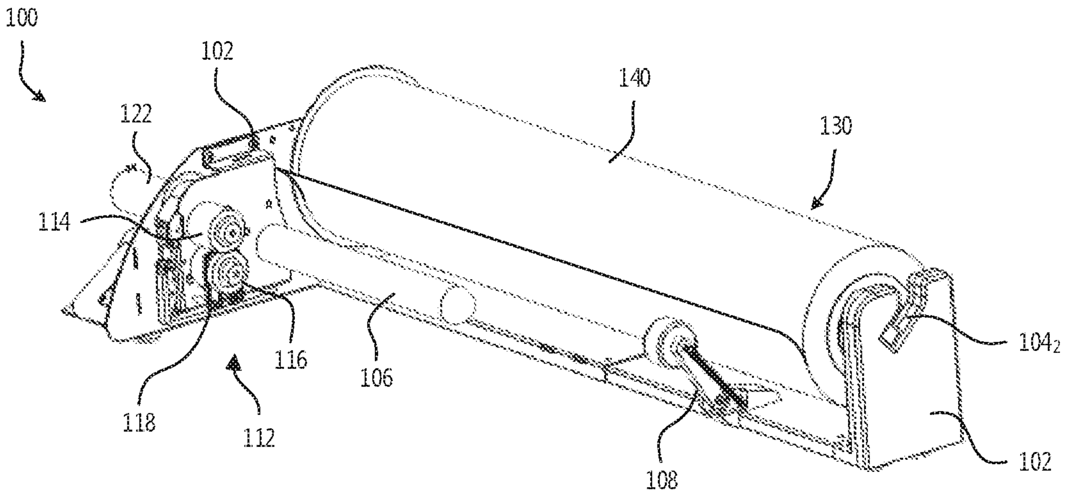
FIGS. 11A and 11B depict an example of how the idler in the film inflation system depicted in FIGS. 1A to 1D maintain tension in the film, in accordance with the embodiments disclosed herein.
Figure 11B:
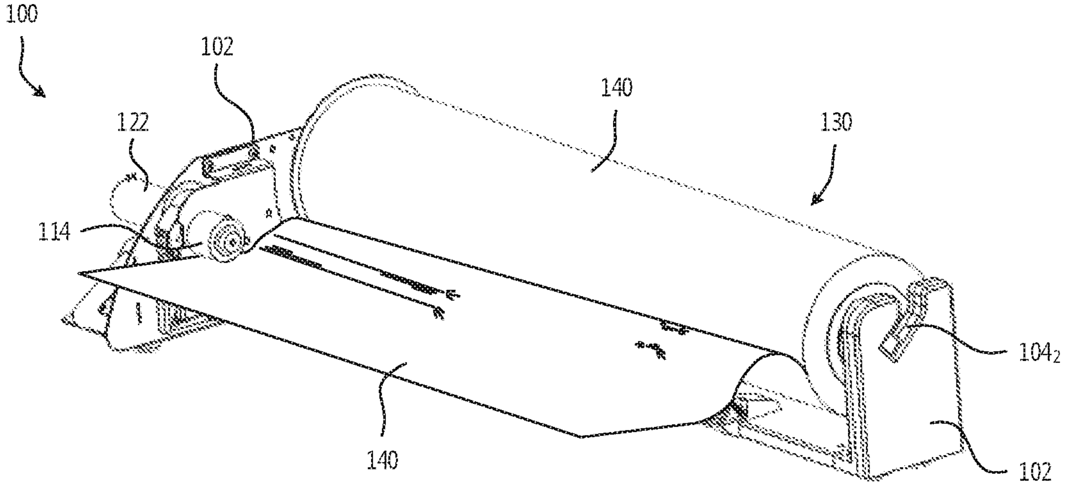

Depicted in FIGS. 10C and 10D is another embodiment of a tensioning system 600. The tensioning system 600 includes two tensioner components 602 and 604 that extend from a housing 102'. In some embodiments, the tensioner components 602 and 604 extend from the housing 102' to a distance such that the tensioner components 602 and 604 engage a portion of the transverse width of the film. In some embodiments, the tensioner components 602 and 604 extend from the housing 102' to a distance such that the tensioner components 602 and 604 engages less than or equal to about one half of the transverse width of the film. In some embodiments, the tensioner components 602 and 604 extend from the housing 102' to a distance such that the tensioner components 602 and 604 engages less than or equal to about one half of the transverse width of the film. In some embodiments, the tensioner components 602 and 604 extend from the housing 102' to a distance such that the tensioner components 602 and 604 engages less than or equal to about one quarter of the transverse width of the film. In some embodiments, the tensioner components 602 and 604 extend from the housing 102' to a distance such that the tensioner components 602 and 604 engages less than or equal to about at least one of the following percentages of the transverse width of the film: 90%, 85%, 80%, 75%, 70%, 65%, 60%, 55%, 50%, 45%, 40%, 35%, 30%, 25%, 20%, 15%, or 10%.

An intended film path 606 of the film through the tensioning system 600 is also depicted in FIGS. 10C and 10D. As shown in the figures, the film path extends from a film roll mounted on the end cap system 500 under the tensioner component 602. From there, the film path 606 proceeds up the left side of the tensioner component 602 and then between the tensioner components 602 and 604. From there, the film path 606 proceeds up the right side of the tensioner component 604. From there, the film path 606 proceeds around the top of the tensioner component 604 and then is drawn toward the nozzle 110'. In the depicted embodiment, the tensioner components 602 and 604 are positioned so that a portion of the film path 606 causes the film to move closer to the film roll as the film passes through the tensioner components 602 and 604. In other words, when looking at FIG. 10D, the film moves to the left as it approaches the tensioner component 602, the film moves to the right as it passes through the tensioner components 602 and 604, and film moves to the left again between the tensioner component 604 and the nozzle 110'. The movement of the film to the right when the film path 606 passes between the tensioner components 602 and 604. This movement to the right may provide a particular level of tension in the film for proper inflation by the nozzle 110' and sealing by the drag sealer 118 as the film passes through the rollers 114 and 116. The embodiment of the tension system 600 may be used with or without additional tensioning devices, such as with or without the idler 320.

Figure 12A:
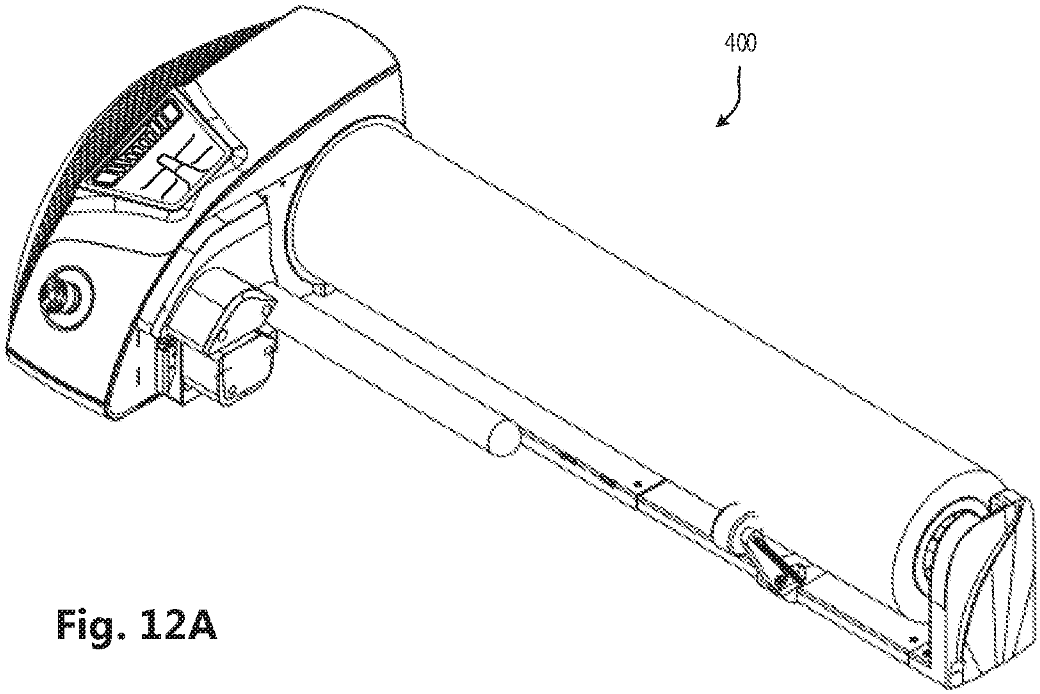
FIGS. 12A to 12F depict various views of one configuration of a film inflation system, in accordance with the embodiments disclosed herein.
Figure 12B:
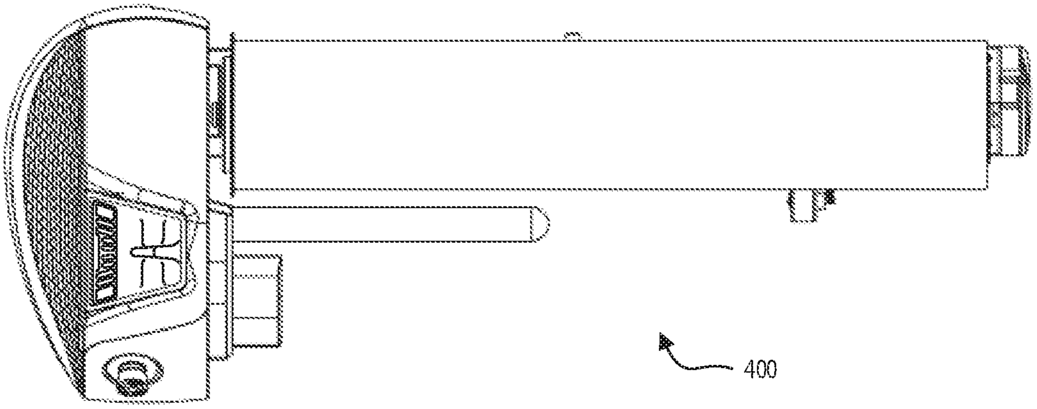
Figure 12C:
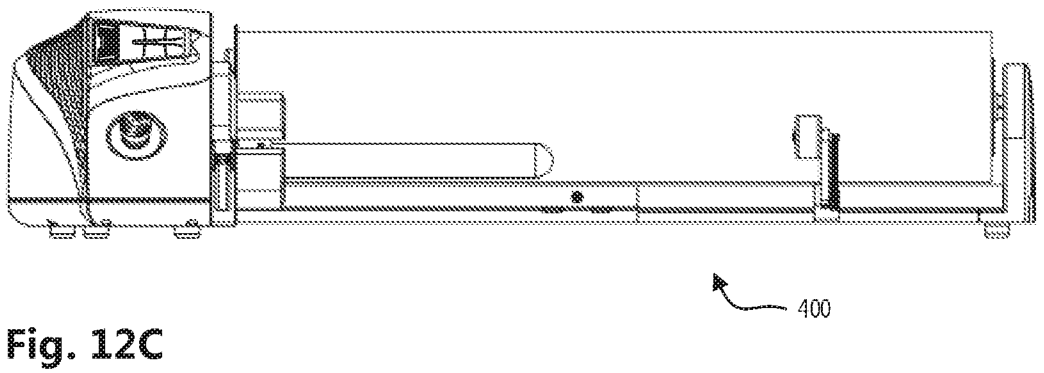
Figure 12D:
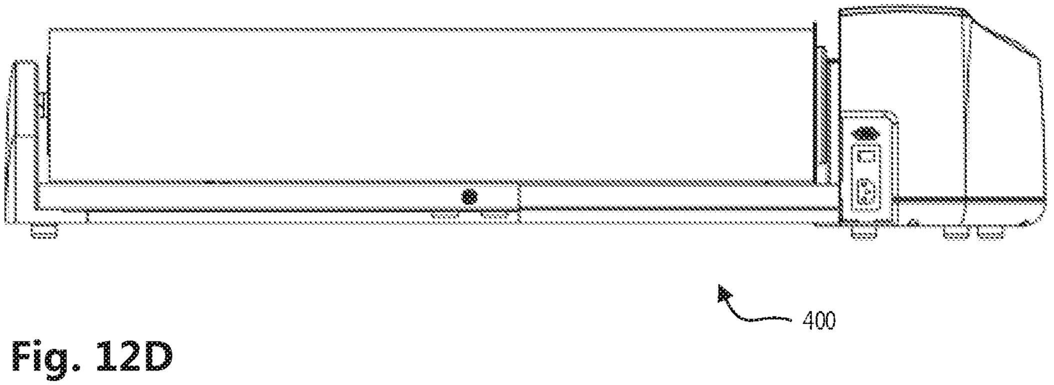
Figure 12E:
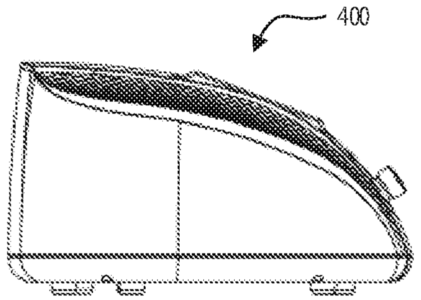
Figure 12F:
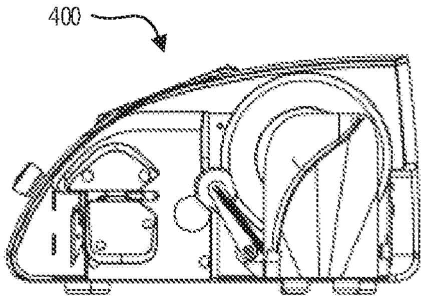
Figure 13A:
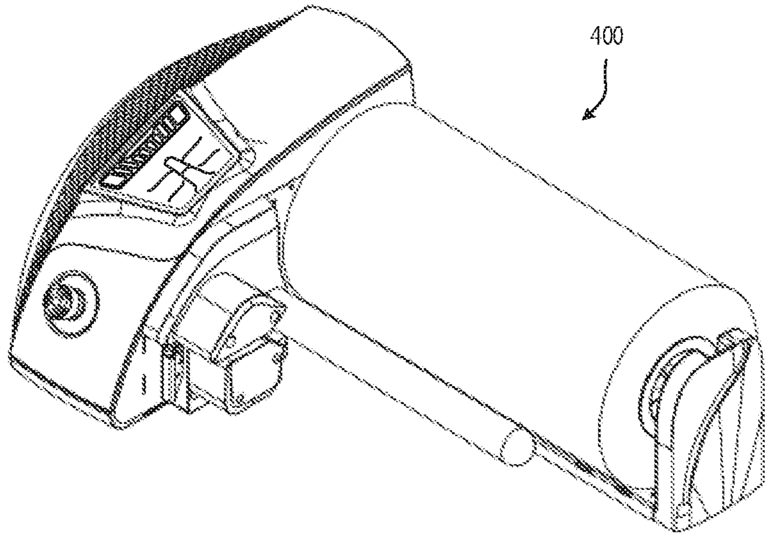
FIGS. 13A to 13F depict various views of another configuration of the film inflation system depicted in FIGS. 12A to 12F, in accordance with the embodiments disclosed herein.
Figure 13B:
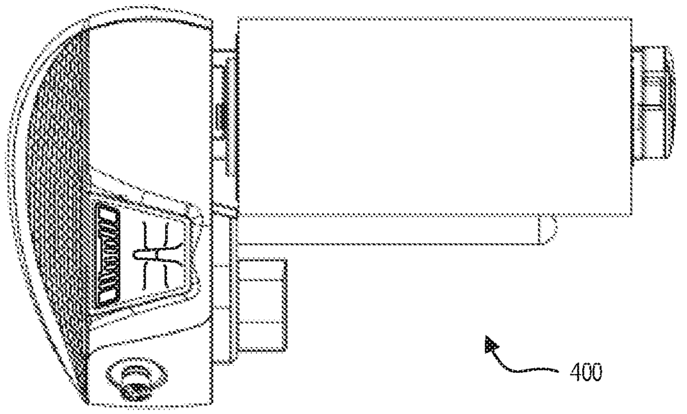
Figure 13C:
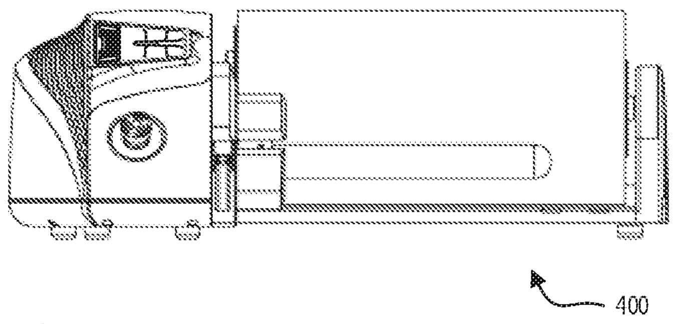
Figure 13D:
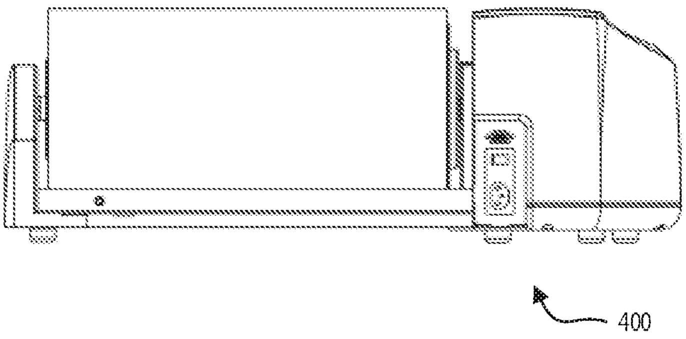
Figure 13E:
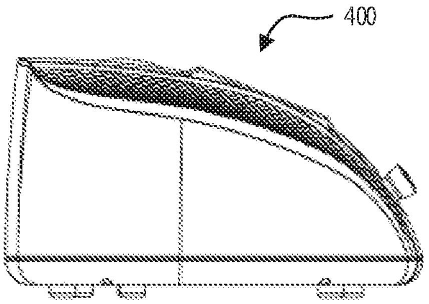
Figure 13F:
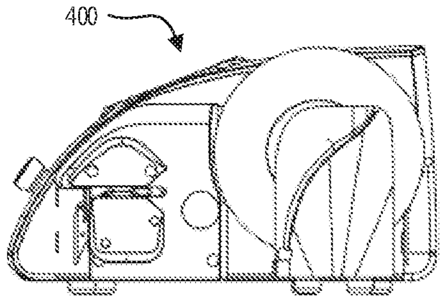

The various embodiments of film inflation systems described herein can have a variety of forms and designs. Depicted in FIGS. 12A to 12F are various views of one configuration of a film inflation system 400. In particular, FIG. 12A depicts a perspective view thereof; FIG. 12B depicts a top view thereof; FIG. 12C depicts a front view thereof; FIG. 12D depicts a back view thereof; FIG. 12E depicts a left side view thereof; and FIG. 12F depicts a right side view thereof. Depicted in FIGS. 13A to 13F are various views of another configuration of the film inflation system 400. In particular, FIG. 13A depicts a perspective view thereof; FIG. 13B depicts a top view thereof; FIG. 13C depicts a front view thereof; FIG. 13D depicts a back view thereof; FIG. 13E depicts a left side view thereof; and FIG. 13F depicts a right side view thereof.

As can be seen, the film inflation system 400 is configured to transition between two configurations to accommodate different width of supply rolls. In the embodiment shown in FIGS. 12A to 12F, the film inflation system 400 is configured to hold a long supply roll of film. In this configuration, the film inflation system also includes an idler to aid a tensioner in maintaining tension in the film as it passes through the film inflation system 400. In the embodiment shown in FIGS. 13A to 13F, the film inflation system 400 is configured to hold a short supply roll of film. In this configuration, the idler has been removed. The idler may be removed when there is not sufficient room between the end of the tensioner and the end of the housing or when the tensioner alone provides sufficient tension in the film as it passes through the film inflation system 400. The idler may be placed back on the housing when the film inflation system 400 is transitioned back from the configuration shown in FIGS. 13A to 13F to the configuration shown in FIGS. 12A to 12F.

Figure 14:
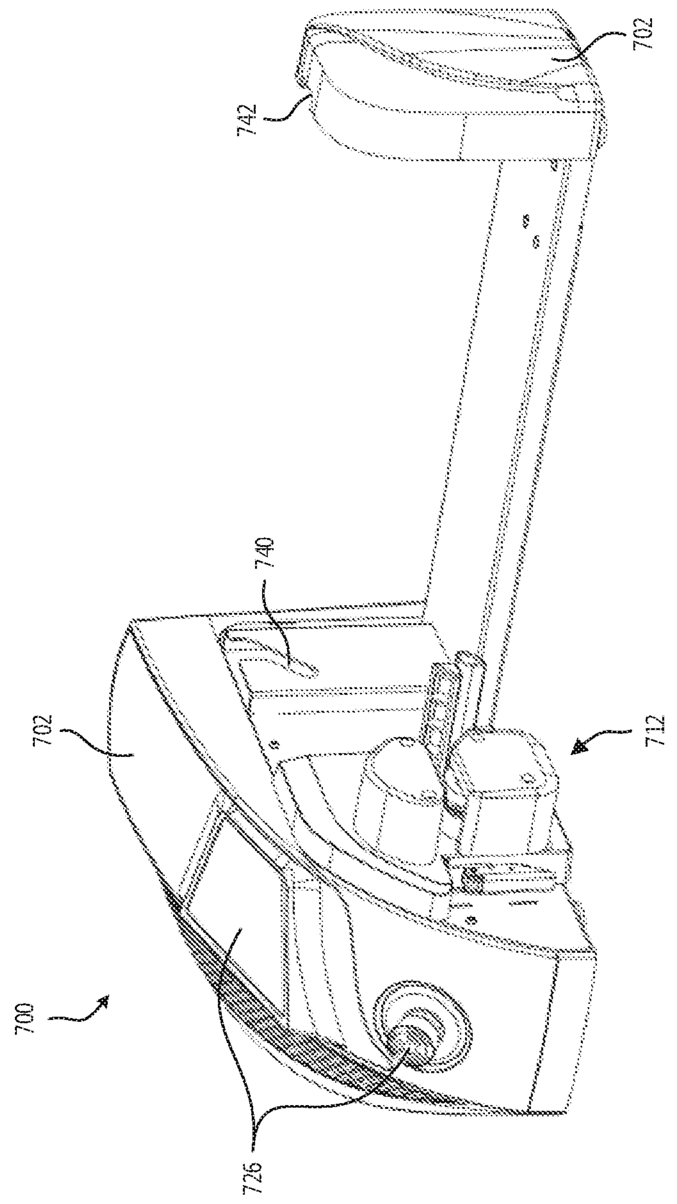
FIG. 14 depicts an embodiment of a film inflation system that is usable with a tension-inducing shaft, in accordance with the embodiments disclosed herein.

In some embodiments, a shaft assembly that holds a film roll is capable of inducing tension in the film as the film is unrolled from the film roll. Such a tension-inducing shaft assembly can provide a simple and cost-effective manner of inducing tension in film that is fed from a roll. Depicted in FIG. 14 is an embodiment of a film inflation system 700 that is usable with a tension-inducing shaft. The film inflation system 700 includes a housing 702 configured to house and/or be coupled to components and systems of the film inflation system 700. In some embodiments, the housing 702 is made from rigid materials, such as aluminum, other metals, thermoset plastics, rigid thermoplastic materials, and the like. In some embodiments, the housing 702 is of a size and shape that permits the film inflation system 100 to be used when placed on a desk top, placed on a table top, mounted on a wall, or in any other consumer environment. In some embodiments, the housing 702 includes exterior structure configured to provide the exterior of the film inflation system 700 and/or interior structure configured to provide support for the exterior structure and for internal components of the film inflation system 700.

The film inflation system 700 also includes a roller assembly 712. The roller assembly 712 is configured to drive film along a film path and to seal the inflatable channels of the film. In some embodiments, the roller assembly 712 includes two rollers that either abut each other or are positioned in an interference fit. A side of the film can be threaded between the rollers 116 and one or both of the rollers can be driven to pull the film off of the supply roll. In some embodiments, the rollers are made from a resilient material, such as a rubber or resilient plastic. The roller assembly 712 can also include a drag sealer (or other sealer) configured to create a seal in the film after the inflatable channels in the film are inflated.

The film inflation system 700 also includes a user interface 726. In some embodiments, the user interface 726 includes a physical button, a keyboard, a mouse, a touch-screen display, a touch sensitive pad, a motion input device, a movement input device, an audio input, a pointing device input, a joystick input, a keypad input, a peripheral device, an audio output device, a video output, a display device, a motion output device, a movement output device, a printing device, a light (e.g., a light-emitting diode (LED)), any other input or output device, or any combination thereof. The user interface 726 can be communicatively coupled to the controller. The user interface 726 is configured to receive user inputs, to communicate the user inputs to the controller, to receive signals from the controller, and to provide an output to the user. In one example, the user interface 726 receives a user input to begin moving and inflating the film, communicates a signal to the controller indicating the user input, receives an indication from the controller that the film inflation system 700 is operating, and illuminates an LED to indicate that the film inflation system 700 is operating. Other functions that can be controlled via the user interface 726 include the flow rate of gas from the gas source to the nozzle, the heat produced by the drag sealer, the speed at which a roller motor operates, or any other function of the film inflation system 700.

The housing 702 of the film inflation system 700 includes slots 740 and 742 configured to be coupled to ends of a shaft. In some embodiments, a shaft located between the slots 740 and 742 is configured to hold a roll of film that can be inflated and sealed by the film inflation system 700. In the depicted embodiment, the slots 740 and 742 include linear portions that at a non-parallel and non-perpendicular angle with respect to vertical. These linear portions may allow for ends of the shaft to slide into proper place under the weight of the film roll and for the shaft to be slid back out of the slots 740 and 742 to replace the film roll. The slots 740 and 742 may be arranged so that the ends of the shaft can be slid into place in the slots 740 and 742 and the shaft can be slid out of the slots 740 and 742 manually without the use of tools.

Figure 15A:
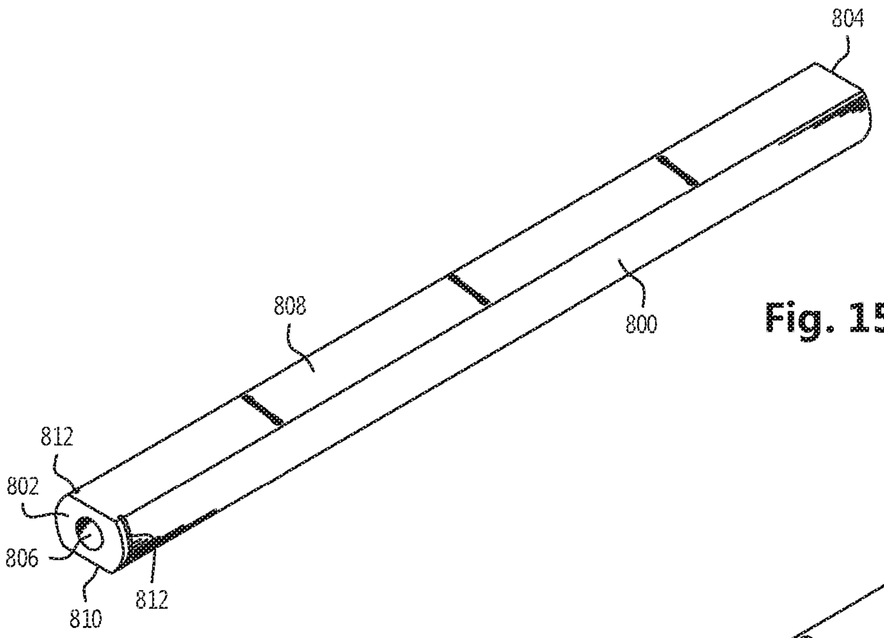
FIG. 15A depicts a perspective view of an embodiment of a shaft that can be used in a tension-inducing shaft assembly, in accordance with the embodiments disclosed herein.

Depicted in FIG. 15A is a perspective view of an embodiment of a shaft 800 that can be used in a tension-inducing shaft assembly. In the depicted embodiment, the shaft 800 has a substantially cylindrical shape that extends from a first end 802 to a second end 804. The shaft 800 includes a bore 806 that runs through the shaft 800 from the first end 802 to the second end 804. In some embodiments, the shaft 800 has an outer diameter of about 1 inch and the bore 806 has a diameter of about 0.5 inches. In some embodiments, the shaft 800 is made from one or more of aluminum, steel, any other metal, or any alloy thereof. In some embodiments, the shaft 800 is made from a non-metallic material, such as a rigid plastic material and the like.

In the depicted embodiment, the shaft 800 includes a keyed surface 808 and a keyed surface 810. The keyed surfaces 808 and 810 are configured to key to corresponding surfaces of a film roll, end caps that hold a film roll, or any other component. In other embodiments, the shaft 800 may include only one of the keyed surfaces 808 and 810. In still other embodiments, the may not include either of the keyed surfaces 808 and 810. The shaft 800 also includes a circumferential groove 812. In the depicted embodiment, the circumferential groove 812 is located proximate the first end 802 of the shaft 800.

Figure 15B:
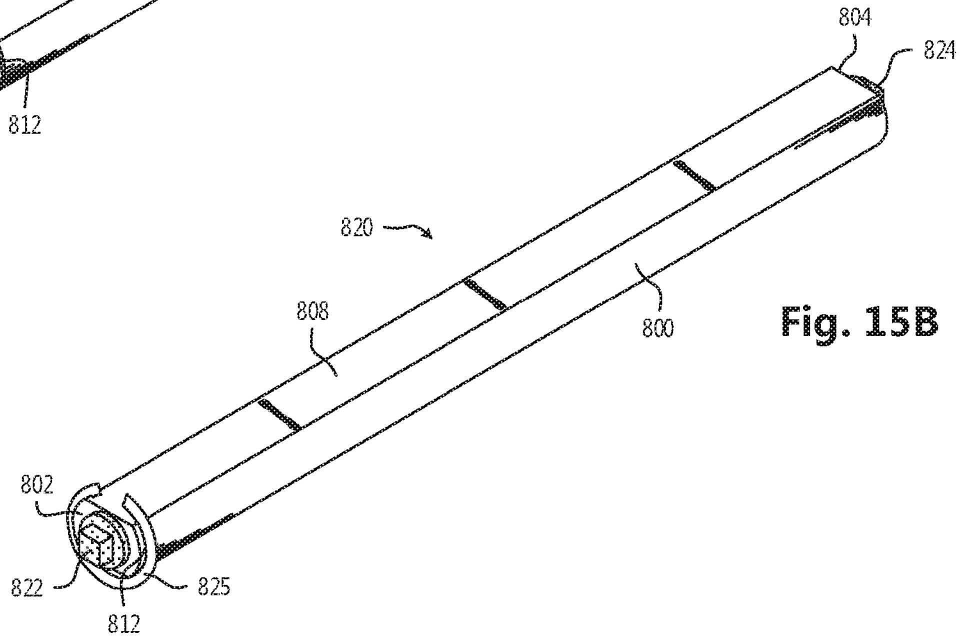
FIG. 15B depicts a perspective view of an embodiment of a tension-inducing shaft assembly that includes the shaft shown in FIG. 15A, in accordance with the embodiments disclosed herein.

Depicted in FIG. 15B is a perspective view of an embodiment of a tension-inducing shaft assembly 820 that includes the shaft 800. The shaft assembly 820 also includes a shaft cap 822 on the first end 802 of the shaft 800 and a shaft cap 824 on the second end 804 of the shaft 800. In the depicted embodiment, the shaft caps 822 and 824 are in the form of plugs and a portion of each of the shaft caps 822 and 824 is located inside of the bore 806 of the shaft 800. The shaft 800 is configured to rotate with respect to each of the shaft caps 822 and 824. The shaft assembly 820 also includes a clip 825. The clip 825 is dimensioned to be located in the circumferential groove 812. The clip 825 is configured to serve as a side justification for a film roll and/or end caps that hold a film roll.

Figure 16A:
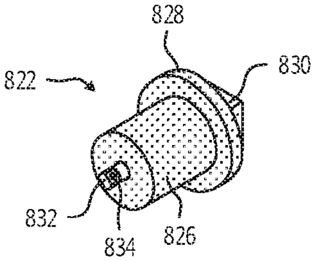
FIGS. 16A and 16B depict front and rear perspective views, respectively, of an embodiment of a shaft cap included in the tension-inducing shaft assembly shown in FIG. 15B, in accordance with the embodiments disclosed herein.
Figure 16B:
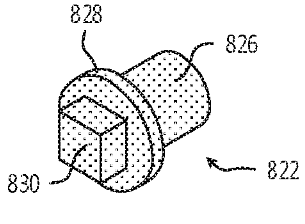

Depicted in FIGS. 16A and 16B are front and rear perspective views, respectively, of an embodiment of the shaft cap 822. The shaft cap 822 includes a body 826, a collar 828, and a keyed end 830. The body 826 is configured to be slid inside of the bore 806. In some embodiments, the cross-sectional shape of the body (e.g., circular) is similar to the cross-sectional shape of the bore 806 (e.g., circular). When the shaft cap 822 is in the position shown in FIG. 15B, the body 826 is located inside the bore 806 proximate the first end 802. The collar 828 has a size that is greater than the bore 806. The collar 828 is configured to contact the first end 802 of the shaft 800 and stop the shaft cap 822 from passing into the bore 806 beyond the position shown in FIG. 15B. The keyed end 830 is configured to engage the housing of a film inflation system such that the shaft cap 822 does not rotate with respect to the housing. In the depicted embodiment, the keyed end 830 is in the form of a square or rectangular that protrudes from the collar 828. The square or rectangular keyed end 830 of the depicted embodiment is configured to engage the slot 740 in the housing 702 of the film inflation system 700 so that the shaft cap 822 does not rotate with respect to the housing 702.

The shaft cap 822 also includes an anchor 832 that is located on the end of the body 826. As is discussed in greater detail below, the anchor 832 is configured to couple the shaft cap 822 to a biasing mechanism (e.g., a spring). In the depicted embodiment, the anchor 832 includes a hole 834 through which a portion of a biasing mechanism can be inserted. For example, in the case where biasing mechanism is a spring that has a hook, the hook of the spring can be inserted through the hole 834 to couple the spring to the shaft cap 822.

In the depicted embodiment, the anchor 832 is configured to swivel, such as by rotating with respect to the body 826. In some embodiments, the body 826, the collar 828, and the keyed end 830 are made from one material (e.g., plastic) and the anchor 832 is made from another material (e.g., metal). In some embodiments, the body 826, the collar 828, and the keyed end 830 are made from a self-lubricating plastic and/or a low-friction plastic, such as polyoxymethylene (sometimes sold under the trade name DELRIN by E. I. du Pont de Nemours and Company). In some embodiments, the shaft cap 824 may be the same as the shaft cap 822 shown in FIGS. 16A and 16B. In other embodiments, the shaft cap 824 may have a body, a collar, and a keyed end that have the same shape and size as the body 826, the collar 828, and the keyed end 830. The shaft cap 824 may also have a non-swiveling anchor that extends from the body of the shaft cap 824. In yet other embodiment, the shaft cap 824 may have a swiveling anchor and the shaft cap 822 may have a non-swiveling anchor. In other words, in some embodiments, at least one of the anchors on the shaft caps 822 and 824 swivels and possibly both of the anchors on the shaft caps 822 and 824 swivel.

Figure 17C:
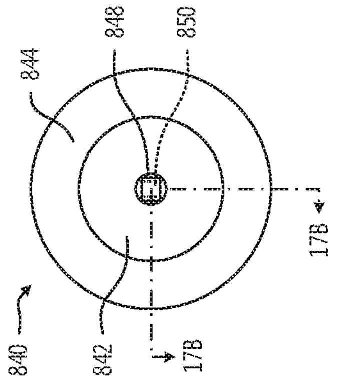
FIGS. 17A, 17B, and 17C depict, respectively, a top view, a side view with a partial cross-sectional view, and a bottom view of one embodiment of a shaft cap that can be used in place of one or both of the shaft caps in the tension-inducing shaft assembly shown in FIG. 15B, in accordance with the embodiments disclosed herein.
Figure 17B:
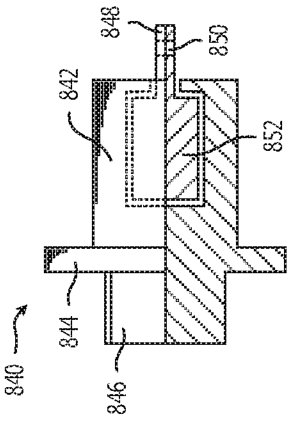
Figure 17A:
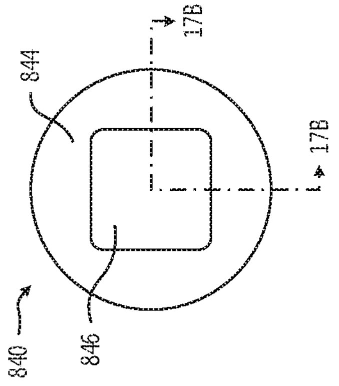

FIGS. 17A, 17B, and 17C depict, respectively, a top view, a side view with a partial cross-sectional view, and a bottom view of one embodiment of a shaft cap 840 that can be used in place of one or both of the shaft caps 822 and 824. The shaft cap 840 includes a body 842, a collar 844, and a keyed end 846 that are similar to the body 826, the collar 828, and the keyed end 830 of the shaft cap 822. The shaft cap 840 also includes an anchor 848 that extends out from the body 842. In the depicted embodiment, the anchor 848 includes a hole 850 through which a portion of a biasing mechanism can be inserted. A portion 852 of the anchor 848 is located inside of the body 842. The portion 852 of the anchor 848 inside of the body 842 is configured to permit the anchor 848 to rotate with respect to the body 842 while deterring linear movement of the anchor 848 with respect to the body 842.

Figure 18C:
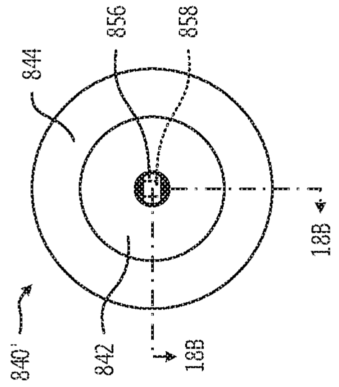
FIGS. 18A, 18B, and 18C depict, respectively, a top view, a side view with a partial cross-sectional view, and a bottom view of another embodiment of a shaft cap that can be used in place of one or both of the shaft caps in the tension-inducing shaft assembly shown in FIG. 15B, in accordance with the embodiments disclosed herein.
Figure 18B:
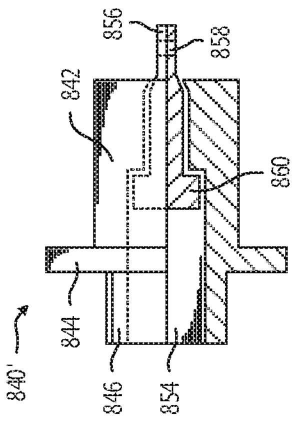
Figure 18A:
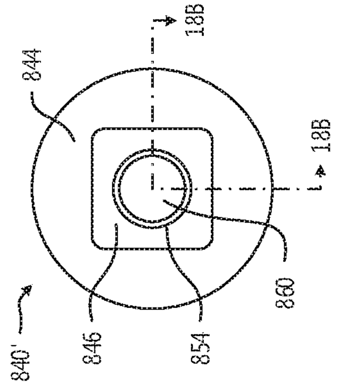

FIGS. 18A, 18B, and 18C depict, respectively, a top view, a side view with a partial cross-sectional view, and a bottom view of one embodiment of a shaft cap 840' that can be used in place of one or both of the shaft caps 822 and 824. The shaft cap 840' is a variation of the shaft cap 840. The shaft cap 840' includes the body 842, the collar 844, and the keyed end 846 that are the same as the corresponding elements of the shaft cap 840. The shaft cap 840' includes a bore 854 that passes through the keyed end 846, the collar 844, and a portion of the body 842. The shaft cap 840' also includes an anchor 856 that is a bolt-style anchor. The anchor 856 extends out from the body 842. In the depicted embodiment, the anchor 848 includes a hole 858 through which a portion of a biasing mechanism can be inserted. The anchor 856 also includes a head 860 that may be similar to a bolt head. The head 860 is configured so that the head can pass through and sit in the bore 854. The anchor 856 can be positioned as shown in FIG. 18B by inserting the anchor 856 into the bore from the left side of the keyed end 830 (as shown in FIG. 18B) and then passing the anchor 856 through the bore 854 to the right until the head 860 reaches the end of the bore 854. The head 860 of the anchor 856 is configured to permit the anchor 856 to rotate with respect to the body 842 while deterring linear movement of the anchor 848 with respect to the body 842 to the right in the view shown in FIG. 18B.

Figure 19A:
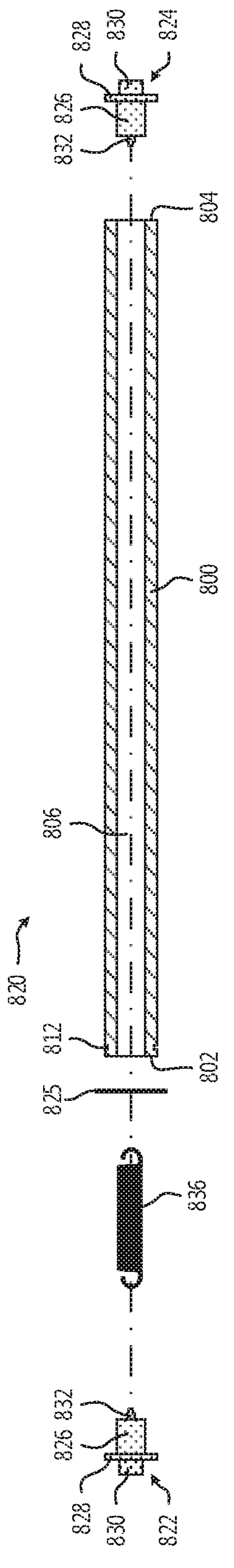
FIGS. 19A and 19B depict an exploded side view and an assembled side view, respectively, of the shaft assembly shown in FIG. 15B, in accordance with the embodiments disclosed herein.
Figure 19B:
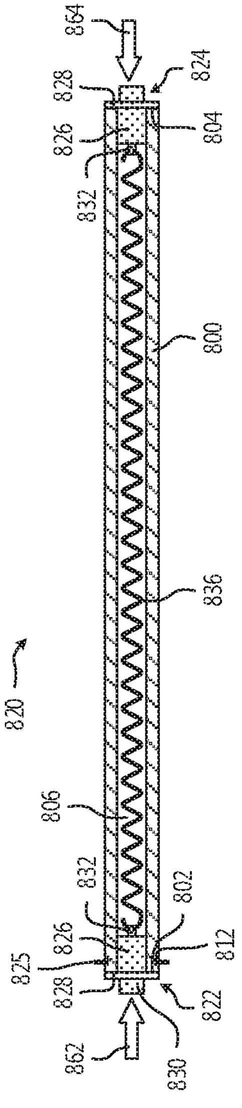

Depicted in FIGS. 19A and 19B are an exploded side view and an assembled side view, respectively, of the shaft assembly 820. In FIGS. 19A and 19B, cross-sectional views of the shaft 800 and the clip 825 are shown for convenience in viewing the other portions of the shaft assembly 820. Also depicted in full side views are the shaft caps 822 and 824 and a biasing mechanism 836. In the depicted embodiment, the shaft cap 824 has the same features as the shaft cap 822 depicted in FIGS. 16A and 16B, including the body 826, the collar 828, the keyed end 830, and the anchor 832 that swivels with respect to the body 826. In the depicted embodiment, the biasing mechanism 836 is a tension spring that has a metal coil with hooks on either side. In other embodiments, the biasing mechanism 836 may be an elastomeric belt or any other biasing mechanism configured to exert a substantially constant compressive force on the shaft caps 822 and 824.

As can be seen in FIG. 19A, the shaft 800, the shaft caps 822 and 824, the clip 825, and the biasing mechanism 836 can all be axially aligned with each other. From the exploded view in FIG. 19A, the shaft assembly 820 can be assembled into the configuration shown in FIG. 19B. More specifically, the shaft assembly 820 can be assembled by positioning the clip 825 in the groove 812, coupling the hooks of the biasing mechanism 836 to the anchors 832 of the shaft caps 822 and 824 with the biasing mechanism 836 located inside of the bore 806, positioning the shaft cap 822 with the collar 828 against the first end 802 of the shaft 800 and the body 826 in the bore 806, and positioning the shaft cap 824 with the collar 828 against the second end 804 of the shaft 800 and the body 826 in the bore 806. The biasing mechanism 836 exerts an inward force 862 on the shaft cap 822 to cause the shaft cap 822 to engage the shaft 800 at the first end 802 and an inward force 864 on the shaft cap 824 to cause the shaft cap 824 to engage the shaft 800 at the second end 804. In embodiments where the biasing mechanism 836 is a constant force biasing mechanism (e.g., a constant force tension spring), the inward forces 862 and 864 may be constant, known forces. In some embodiments, the magnitude of the inward force 862 is substantially similar to the magnitude of the inward force 864.

Each of the shaft caps 822 and 824 is configured to rotate with respect to the other of the shaft caps 822 and 824. One reason to have one or both of the anchors be a swiveling anchor is to permit relative rotation of the shaft caps 822 and 824 while the biasing mechanism 836 is coupled to the anchors without causing torque on the biasing mechanism 836 or the anchors sufficient to plastically deform the biasing mechanism 836 or the anchors.

Each of the shaft caps 822 and 824 is configured to rotate with respect to the shaft 800. When the keyed ends 830 of the shaft caps 822 and 824 are coupled to a housing (e.g., housing 702) so that the shaft caps 822 and 824 do not rotate with respect to the housing, the shaft 800 is still capable of rotating with respect to the housing by rotating with respect to the shaft caps 822 and 824. When a film roll is loaded on the shaft 800 and the film is unwound from the roll, the shaft 800 will rotate with respect to the shaft caps 822 and 824. The friction between the shaft 800 and the shaft caps 822 and 824 will resist the rotation of the roll, resulting in tension in the film unwound from the roll. In the embodiments where the force applied by the biasing mechanism 836 is substantially constant, the friction between the shaft 800 and the shaft caps 822 and 824 is also substantially constant. In this way, the tension induced in the film by the shaft assembly 820 can be substantially constant.

Figure 19C:
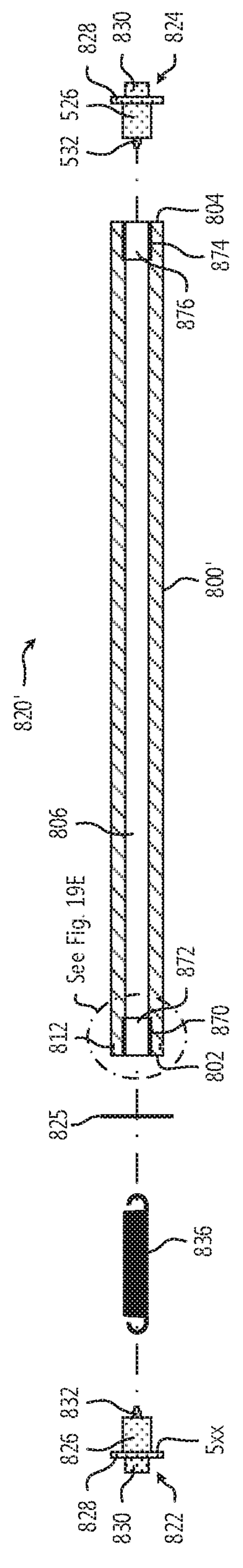
FIGS. 19C and 19D depict an exploded side view and an assembled side view, respectively, of a shaft assembly that is an variation of the shaft assembly shown in FIG. 15B, in accordance with the embodiments disclosed herein.
Figure 19E:
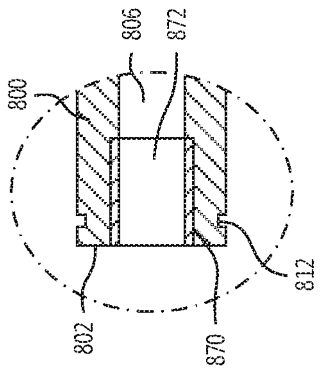
FIG. 19E depicts a partial section view of the shaft assembly shown in FIGS. 19C and 19D, in accordance with the embodiments disclosed herein; and Depicted in FIGS. 20A, 20B, 20C, and 20D are front views of instances, respectively, of the shaft assembly shown in FIG. 15B, of the shaft assembly shown in FIG. 15B holding an embodiment of a supply roll of film, of the shaft assembly shown in FIG. 15B holding that supply roll of film in the film inflation system shown in FIG. 14, and of the shaft assembly shown in FIG. 15B holding another embodiment of a supply roll of film in the film inflation system shown in FIG. 14, in accordance with the embodiments disclosed herein.
Figure 19D:
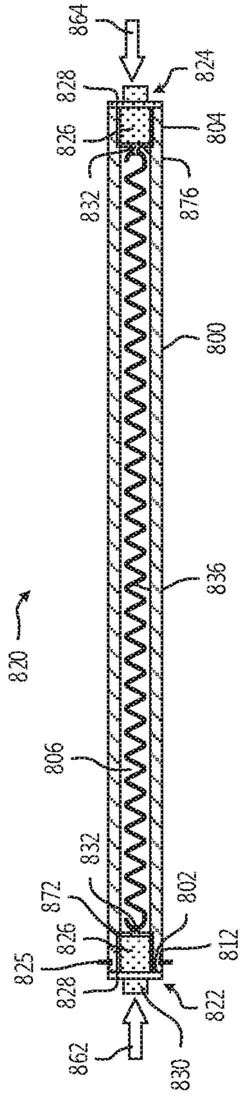

Depicted in FIGS. 19C and 19D are an exploded side view and an assembled side view, respectively, of an embodiment of a shaft assembly 820'. FIG. 19E depicts a partial section view of the shaft assembly 820' shown in FIG. 19C. The shaft assembly 820' is similar to the shaft assembly 820, with a few exceptions. The shaft assembly 820' includes a shaft 800'. The shaft 800' is similar to the shaft 800 in that is includes the first end 802, the second end 804, the bore 806 and other features. The shaft 800' also includes a counterbore 870 at the first end 802 of the shaft 800'. The counterbore 870 has a larger diameter than the bore 806. The shaft 800' includes a bearing 872 located in the counterbore 870. The coefficient of friction between the bearing 872 and the body 826 of the shaft cap 822 is lower than the coefficient of friction between the bore 806 and the body 826 of the shaft cap 822. The shaft 800' also includes a counterbore 874 at the second end 804 of the shaft 800'. The counterbore 874 has a larger diameter than the bore 806. The shaft 800' includes a bearing 876 located in the counterbore 874. The coefficient of friction between the bearing 876 and the body 826 of the shaft cap 824 is lower than the coefficient of friction between the bore 806 and the body 826 of the shaft cap 824. The shaft assembly 820' operates similarly to the operations of the shaft assembly 820 described herein.

As described above, the shaft assembly 820 can be used to hold a supply roll of film in a film inflation system to induce tension in the film as the film is fed from the roll to the film inflation system. Depicted in FIGS. 20A, 20B, 20C, and 20D are front views of instances, respectively, of the shaft assembly 820, of the shaft assembly 820 holding an embodiment of a supply roll of film, of the shaft assembly 820 holding that supply roll of film in the film inflation system 700, and of the shaft assembly 820 holding another embodiment of a supply roll of film in the film inflation system 700. In FIGS. 20B, 20C, and 20D, the supply rolls of film are shown in cross sectional views through a plane that is substantially vertical and passes through the axis of the shaft 800. In FIGS. 20C and 20D, the housing 702 of the film inflation system 700 is shown in cross sectional views through the same plane that is substantially vertical and passes through the axis of the shaft 800.

Figure 20A:
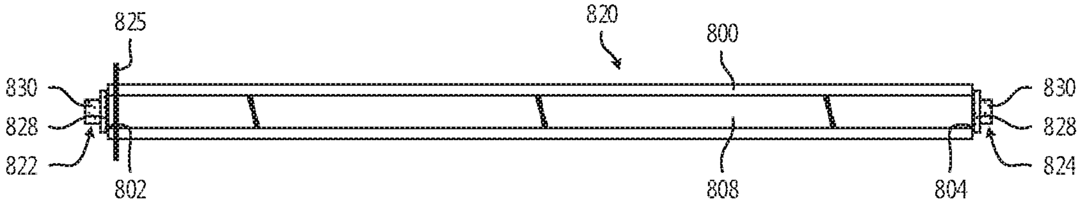
Figure 20B:
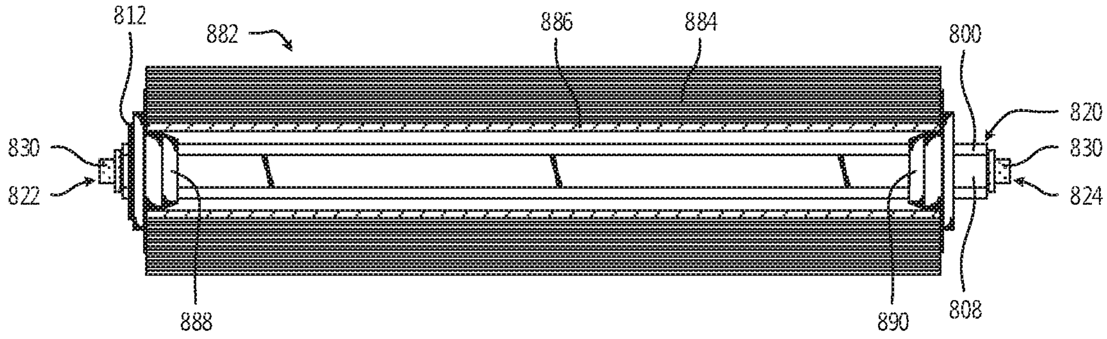
Figure 20C:
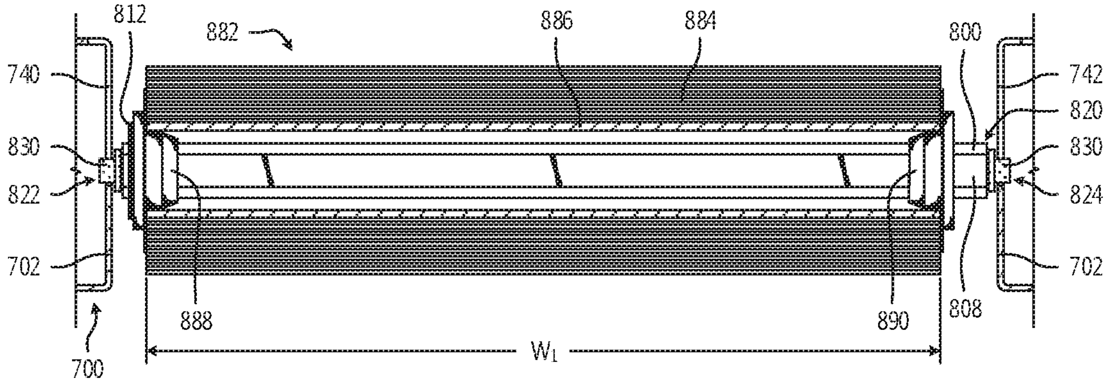
Figure 20D:
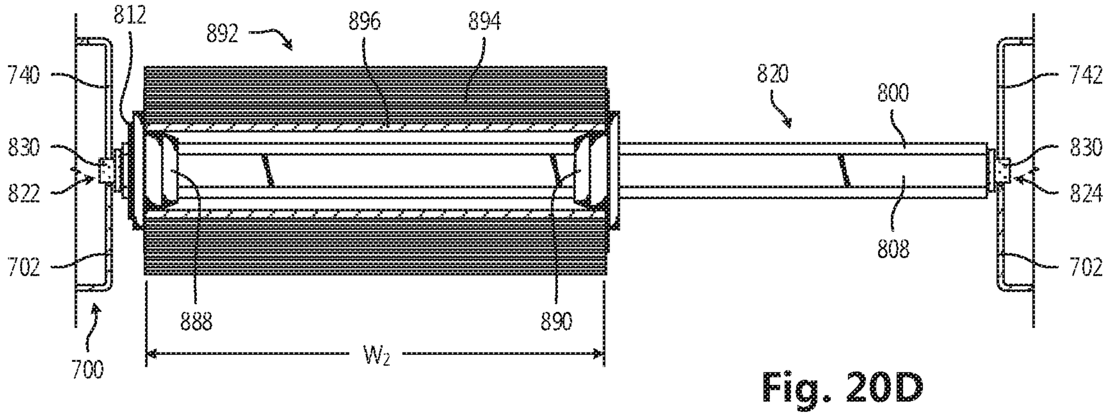

In FIG. 20A, the shaft assembly 820 has been assembled. The shaft cap 822 is on the first end 802 of the shaft 800 and the shaft cap 824 is on the second end 804 of the shaft 800. Although not visible in FIG. 20A, the biasing mechanism 836 passes through the bore 806 and is coupled to each of the first and second shaft caps 822 and 824. The biasing mechanism 836 causes inward forces to be exerted on each of the first and second shaft caps 822 and 824. The shaft 800 is capable of rotating with respect to each of the first and second shaft caps 822 and 824. In the depicted embodiment, the shaft 800 has been rotated such that the keyed surface 808 is oriented on the front of the shaft assembly 820. The clip 825 is located in the groove 812 of the shaft 800 proximate the first end 802 of the shaft 800.

In FIG. 20B, a supply roll 882 of film 884 has been loaded on the shaft assembly 820. The supply roll 882 includes a core 886. In some embodiments, the core 886 is made from a paper product (e.g., a cardboard tube, a Kraft paper tube, etc.), a plastic material, or any other material. In the supply roll 882, the film 884 is wound around the core 886. In some embodiments, the film 884 includes at least one or more of polyethylene, ethylene/alpha-olefin copolymer, ethylene/unsaturated ester copolymer, ethylene/unsaturated acid copolymer, polypropylene, propylene/ethylene copolymer, polyethylene terephthalate, polyamide, polyvinylidene chloride, polyacrylonitrile, EVOH, or PVOH. In the depicted embodiment, the core 886 has a hollow bore.

The supply roll 882 has been loaded onto end caps 888 and 890. The end cap 888 is configured to be inserted into one end of the hollow bore of the core 886 and the end cap 890 is configured to be inserted into the other end of the hollow bore of the core 886. In some embodiments, a material and/or thickness of the core 886 is selected so that the core 886 does not deform from the weight of the film 884, when the core 886 is placed on the end caps 888 and 890. In some embodiments, the end caps 888 and 890 are made from a rigid material, such as a rigid plastic material, a metal material, and the like.

The end caps 888 and 890 can be placed on the supply roll 882 before the supply roll 882 and the end caps 888 and 890 are loaded onto the supply roll 882. After the end caps 888 and 890 are placed on the supply roll 882, the supply roll 882 and the end caps 888 and 890 can be slid onto the shaft 800. In the depicted embodiment, the end cap 888 can be slid onto the right end (as seen in FIG. 20B) of the shaft 800, the end cap 888 can be slid to the left until the end cap 890 is also slid onto the right end of the shaft 800, and then the end caps 888 and 890 can be slid further to the left until the end cap 888 contacts the clip 825 and the supply roll 882 and the end caps 888 and 890 are in the location shown in FIG. 20C. Each of the end caps 888 and 890 has a hole that permits the end caps 888 and 890 to be slid onto and across the shaft 800. In some embodiments, the holes in the end caps 888 and 890 have a shape corresponding to the cross-section of the shaft 800. For example, in the depicted embodiment, the holes in the end caps 888 and 890 can have surfaces corresponding to the keyed surface 808. In this way, the end caps 888 and 890 are keyed to the shaft 800 such that rotation of the shaft 800 causes a corresponding rotation of the end caps 888 and 890 and vice versa.

With the supply roll 882 and the end caps 888 and 890 loaded on the shaft assembly 820, the shaft assembly 820 can be placed into the housing 702 of the film inflation system 700. In some embodiments, the shaft assembly 820 is placed into the housing 702 of the film inflation system 700 by sliding the keyed ends 830 of the shaft caps 822 and 824 through the slots 740 and 742, respectively, until the shaft assembly 820 is in the position depicted in FIG. 20C. In the depicted position, the shapes of the keyed ends 830 and the slots 740 and 742 are arranged to prevent rotation of the shaft caps 822 and 824 with respect to the housing 702.

With the shaft assembly 820 placed into the housing 702 of the film inflation system 700, the film 884 can be withdrawn from the supply roll 882 to supply the film 884 to the film inflation assembly. For example, the film 884 can be fed from the supply roll 882 to the roller assembly 712 and the roller assembly 712 can feed the film 884. As the film 884 is withdrawn from the supply roll 882, the withdrawing of the film 884 will cause the supply roll 882 to rotate with respect to the housing 702. The rotation of the supply roll 882 causes corresponding rotation of the end caps 888 and 890. The rotation of the end caps 888 and 890 causes corresponding rotation of the shaft 800. The shaft 800 will rotate with respect to the shaft caps 822 and 824, which do not rotate with respect to the housing 702. The inward forces of the shaft caps 822 and 824 on the shaft 800—due to the effect of the biasing mechanism 836 on the shaft caps 822 and 824—causes friction between the shaft 800 and the shaft caps 822 and 824, which resists the rotation of the shaft 800. The resistance of the rotation of the shaft 800 with respect to the shaft caps 822 and 824 induces tension in the film 884 that is being pulled from the supply roll 882. In embodiment where the inward forces of the shaft caps 822 and 824 on the shaft 800 are substantially constant (e.g., when the biasing mechanism 836 is a constant force spring), the tension induced in the unwinding film 884 is substantially constant.

The shaft assembly 820 and the supply roll 882 can be used with multiple supply rolls of film, including supply rolls of different size. For example, the shaft assembly 820 can be removed from position in the housing 702 shown in FIG. 20C by lifting the shaft assembly 820 so that the keyed ends 830 of the shaft caps 830 slide up and out of the slots 740 and 742. The end caps 888 and 890 can then be slid off of the shaft 800 and removed from the supply roll 882. The ends caps 888 and 890 can then be placed on another supply roll, such as a supply roll 892 of film 894. The supply roll 882 includes a core 886 around which the film 894 has been wound. The end caps 888 and 890 can be inserted into either end of the hollow bore of the core 896.

After the end caps 888 and 890 are placed on the supply roll 892, the supply roll 892 and the end caps 888 and 890 can be slid onto the shaft 800. In the depicted embodiment, the end cap 888 can be slid onto the right end (as seen in FIG. 20D) of the shaft 800, the end cap 888 can be slid to the left until the end cap 890 is also slid onto the right end of the shaft 800, and then the end caps 888 and 890 can be slid further to the left until the end cap 888 contacts the clip 825 and the supply roll 892 and the end caps 888 and 890 are in the location shown in FIG. 20D.

With the supply roll 892 and the end caps 888 and 890 loaded on the shaft assembly 820, the shaft assembly 820 can be placed into the housing 702 of the film inflation system 700. In some embodiments, the shaft assembly 820 is placed into the housing 702 of the film inflation system 700 by sliding the keyed ends 830 of the shaft caps 822 and 824 through the slots 740 and 742, respectively, until the shaft assembly 820 is in the position depicted in FIG. 20D. In the depicted position, the shapes of the keyed ends 830 and the slots 740 and 742 are arranged to prevent rotation of the shaft caps 822 and 824 with respect to the housing 702.

With the shaft assembly 820 placed into the housing 702 of the film inflation system 700, the film 894 can be withdrawn from the supply roll 892 to supply the film 894 to the film inflation assembly. For example, the film 894 can be fed from the supply roll 892 to the roller assembly 712 and the roller assembly 712 can feed the film 894. As the film 894 is withdrawn from the supply roll 892, the withdrawing of the film 894 will cause the supply roll 892 to rotate with respect to the housing 702. The rotation of the supply roll 892 causes corresponding rotation of the end caps 888 and 890. The rotation of the end caps 888 and 890 causes corresponding rotation of the shaft 800. The shaft 800 will rotate with respect to the shaft caps 822 and 824, which do not rotate with respect to the housing 702. The inward forces of the shaft caps 822 and 824 on the shaft 800—due to the effect of the biasing mechanism 836 on the shaft caps 822 and 824—causes friction between the shaft 800 and the shaft caps 822 and 824, which resists the rotation of the shaft 800. The resistance of the rotation of the shaft 800 with respect to the shaft caps 822 and 824 induces tension in the film 894 that is being pulled from the supply roll 892. In embodiment where the inward forces of the shaft caps 822 and 824 on the shaft 800 are substantially constant (e.g., when the biasing mechanism 836 is a constant force spring), the tension induced in the unwinding film 894 is substantially constant.

One difference between the supply roll 882 and the supply roll 892 depicted in FIGS. 20C and 20D is the difference in their widths. More specifically, the supply roll 882 has a width $W_1$ and the supply roll 892 has a width $W_2$. In the depicted embodiment, the width $W_1$ is greater than the width $W_2$. As is apparent when viewing FIGS. 20C and 20D, the same tension-inducing shaft assembly 820 can be used with the films of different widths and induce tension into the film that is withdrawn from the supply rolls regardless of the width of the supply roll placed on the shaft assembly 820.

For purposes of this disclosure, terminology such as "upper," "lower," "vertical," "horizontal," "inwardly," "outwardly," "inner," "outer," "front," "rear," and the like, should be construed as descriptive and not limiting the scope of the claimed subject matter. Further, the use of "including," "comprising," or "having" and variations thereof herein is meant to encompass the items listed thereafter and equivalents thereof as well as additional items. Unless limited otherwise, the terms "connected," "coupled," and "mounted" and variations thereof herein are used broadly and encompass direct and indirect connections, couplings, and mountings. Unless stated otherwise, the terms "substantially," "approximately," and the like are used to mean within 5% of a target value.

The principles, representative embodiments, and modes of operation of the present disclosure have been described in the foregoing description. However, aspects of the present disclosure which are intended to be protected are not to be construed as limited to the particular embodiments disclosed. Further, the embodiments described herein are to be regarded as illustrative rather than restrictive. It will be appreciated that variations and changes may be made by others, and equivalents employed, without departing from the spirit of the present disclosure. Accordingly, it is expressly intended that all such variations, changes, and equivalents fall within the spirit and scope of the present disclosure, as claimed.

What is claimed is:

1. A system comprising:

a shaft having a first end and a second end, the shaft including a bore that extends through the shaft from the first end to the second end;

a first shaft cap positioned on the first end of the shaft, wherein the first shaft cap includes a first collar having a size that is larger than the bore, a first keyed end, and a first anchor;

a second shaft cap positioned on the second end of the shaft, wherein the second shaft cap includes a second collar having a size that is larger than the bore, a second keyed end, and a second anchor;

a biasing mechanism arranged inside the bore of the shaft and coupled to the first anchor of the first shaft cap and to the second anchor of the second shaft cap so that the biasing mechanism exerts inward forces on the first and second shaft caps;

wherein the first and second keyed ends are configured to be coupled to a housing so that the first and second shaft caps do not rotate with respect to the housing; and wherein the shaft is configured to rotate with respect to the first and second shaft caps such that, when the first and second keyed ends are coupled to the housing, the shaft is capable of rotating with respect to the housing;

wherein at least one of the first anchor and the second anchor is configured to swivel.

2. The system of claim 1, wherein the at least one of the first and second anchors is configured to swivel during respective rotation of the first and second shaft caps so that the respective rotation of the first and second shaft caps does not cause torque on the biasing mechanism or the first and second anchors sufficient to plastically deform the biasing mechanism or the first and second anchors.

3. The system of claim 1, wherein:
the first shaft cap further includes a first body configured to be slid inside of the bore of the shaft from the first end of the shaft; and
the second shaft cap further includes a second body configured to be slid inside of the bore of the shaft from the second end of the shaft.

4. The system of claim 3, wherein:
the first anchor extends from an end of the first body of the first shaft cap; and
the second anchor extends from an end of the second body of the second shaft cap.

5. The system of claim 3, further comprising:
a first counterbore at the first end of the shaft;
a second counterbore at the first end of the shaft;
a first bearing located in the first counterbore, wherein a coefficient of friction between the first bearing and the first body of the first shaft cap is lower than a coefficient of friction between the bore and the first body of the first shaft cap; and
a second bearing located in the second counterbore, wherein a coefficient of friction between the second bearing and the second body of the first shaft cap is lower than a coefficient of friction between the bore and the second body of the second shaft cap.

6. The system of claim 3, wherein a material of the first collar, the first body, the first collar, the second body, and the second collar includes at least one of a self-lubricating plastic or a low-friction plastic.

7. The system of claim 3, wherein a material of the first collar, the first body, the first collar, the second body, and the second collar includes polyoxymethylene.

8. The system of claim 1, wherein the shaft includes at least one keyed surface.

9. The system of claim 8, wherein the at least one keyed surface is configured to key to a corresponding surface of at least one of a film roll positioned on the shaft or end caps that are positioned on the shaft.

10. The system of claim 1, wherein:
the first keyed end is a square or rectangular protrusion that extends from the first collar of the first shaft cap; and
the second keyed end is a square or rectangular protrusion that extends from the second collar of the second shaft cap.

11. A system comprising:
a shaft having a first end and a second end, the shaft including a bore that extends through the shaft from the first end to the second end;
a first shaft cap positioned on the first end of the shaft, wherein the first shaft cap includes a first collar having a size that is larger than the bore, a first keyed end, and a first anchor;
a second shaft cap positioned on the second end of the shaft, wherein the second shaft cap includes a second collar having a size that is larger than the bore, a second keyed end, and a second anchor;
a biasing mechanism arranged inside the bore of the shaft and coupled to the first anchor of the first shaft cap and to the second anchor of the second shaft cap so that the biasing mechanism exerts inward forces on the first and second shaft caps;
wherein the first and second keyed ends are configured to be coupled to a housing so that the first and second shaft caps do not rotate with respect to the housing; and
wherein the shaft is configured to rotate with respect to the first and second shaft caps such that, when the first and second keyed ends are coupled to the housing, the shaft is capable of rotating with respect to the housing;
wherein the shaft includes a circumferential groove located proximate the first end of the shaft.

12. The system of claim 11, further comprising:
a clip located in the circumferential groove, wherein the clip is configured to serve as a side justification for at least one of a film roll positioned on the shaft or end caps that are positioned on the shaft.

13. A system comprising:
a housing; and
a shaft assembly comprising:
a shaft having a first end and a second end, the shaft including a bore that extends through the shaft from the first end to the second end,
a first shaft cap positioned on the first end of the shaft,
a second shaft cap positioned on the second end of the shaft, and
a biasing mechanism arranged inside the bore of the shaft and coupled to the first shaft cap and to the second shaft cap so that the biasing mechanism exerts inward forces on the first and second shaft caps;
wherein the first and second shaft caps are coupled to the housing so that the first and second shaft caps do not rotate with respect to the housing; and
wherein the shaft is configured to rotate with respect to the first and second shaft caps such that the shaft is capable of rotating with respect to the housing;
wherein at least one of the first anchor and the second anchor is configured to swivel.

14. The system of claim 13, further comprising:
a supply roll of film loaded on the shaft so that rotation of the supply roll of film with respect to the housing causes rotation of the shaft with respect to the housing.

15. The system of claim 14, wherein the supply roll of film includes a film wound around a core, wherein withdrawal of the film from the core causes rotation of the supply roll.

16. The system of claim 15, further comprising:
a first end cap configured to be inserted into a first end of the core; and
a second end cap configured to be inserted into a second end of the core.

17. The system of claim 16, wherein each of the first and second end caps includes a hole that permits each of the respect first and second end caps to be slid onto and across the shaft.

18. The system of claim 13, wherein:
the housing includes a first slot and a second slot;
the first shaft cap includes a first keyed end;
the second shaft cap includes a second keyed end; and
the first and second shaft caps are configured to be coupled to the housing by sliding the first and second keyed ends into the first and second slots, respectively.

19. The system of claim 18, wherein the shaft assembly is configured to be uncoupled from the housing by lifting the shaft assembly so that the first and second keyed ends of the first and second shaft caps slide out of the first and second slots, respectively.

20. The system of claim 13, wherein the shaft assembly is capable of holding supply rolls of multiple different widths.

* * * * *